(12) United States Patent
Terada

(10) Patent No.: US 8,184,994 B2
(45) Date of Patent: May 22, 2012

(54) OPTICAL RECEIVING CIRCUIT

(75) Inventor: Koji Terada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 343 days.

(21) Appl. No.: 12/637,082

(22) Filed: Dec. 14, 2009

(65) Prior Publication Data

US 2010/0119230 A1 May 13, 2010

Related U.S. Application Data

(63) Continuation of application No. PCT/JP2007/063121, filed on Jun. 29, 2007.

(51) Int. Cl.
*H04B 10/06* (2006.01)
(52) U.S. Cl. ........................ 398/207; 398/212
(58) Field of Classification Search ............... 398/207, 398/212
See application file for complete search history.

(56) References Cited

U.S. PATENT DOCUMENTS

| | | |
|---|---|---|
| 2005/0036727 A1 | 2/2005 | Wijngaarden et al. |
| 2005/0226633 A1 | 10/2005 | Liu |
| 2006/0193639 A1 | 8/2006 | Liu et al. |
| 2008/0232815 A1 | 9/2008 | Shioiri et al. |

FOREIGN PATENT DOCUMENTS

| | | |
|---|---|---|
| EP | 1507346 | 2/2005 |
| EP | 1583263 | 10/2005 |
| JP | 2005-65273 | 3/2005 |
| JP | 2005-94287 | 4/2005 |
| JP | 2005-223418 | 8/2005 |
| JP | 2005-295559 | 10/2005 |
| JP | 2006-246471 | 9/2006 |
| WO | 2007/001090 | 1/2007 |

OTHER PUBLICATIONS

Japanese PCT International Preliminary Report on Patentability mailed Jan. 14, 2010 in corresponding International Patent Application PCT/JP2007/063121 (7 pages) including English translation of the International Preliminary Report on Patentability mailed Feb. 4, 2010 (6 pages).

Daikoku, M. et al., *Performace comparison of modulation formats for 40 Gbit/s DWDM transmission systems*, Optical Fiber Communication Conference, 2005 Technical Digest, OFC/NFOEC vol. 4, Mar. 6-11, 2005 (3 pp.).

(Continued)

*Primary Examiner* — Leslie Pascal
(74) *Attorney, Agent, or Firm* — Staas & Halsey LLP

(57) ABSTRACT

An optical receiving circuit receives and demodulates an optical signal subjected to phase modulation and wavelength division multiplexing. The optical receiving circuit includes an interfering unit that causes a reference signal to interfere with the optical signal to output resulting signals as positive-phase signals and negative-phase signals; and a wavelength separator having input ports receiving the positive-phase signals and the negative-phase signals, the positive-phase and negative-phase signals being adjacent to each other. The wavelength separator separates according to wavelength, the positive-phase signals and the negative-phase signals, and from output ports, outputs for each wavelength, a separated positive-phase signal and negative-phase signal in a state of being adjacent to each other. The optical receiving circuit further includes balanced receivers respectively provided for each wavelength, where a given balanced receiver for a given wavelength performs balanced reception and demodulation of the separated positive-phase signal and negative phase signal of the given wavelength.

11 Claims, 17 Drawing Sheets

OTHER PUBLICATIONS

Serbay, M. et al., *Comparison of six different RZ-DQPSK transmitter set-ups regarding their tolerance towards fibre impairments in 8x40Gb/s WDM-systems*, Advanced Modulation Formats, 2004 IEEE/LEOS Workshop on Jul. 1-2, 2004, pp. 9-10.

Winzer, P. et al., *Degradations in Balanced DPSK Receivers*, IEEE Photonics Technology Letters, vol. 15, No. 9, Sep. 2003, pp. 1282-1284.

Yoshinake, N. et al., *1.14 b/s/Hz spectrally-efficient 50 x 85.4 Gb/s transmission over 300 km using copolarized CS-RZ DQPSK signals*, Optical Fiber Communication Conference, 2004, OFC 2004, vol. 2, Feb. 23-27, 2004 (3 pp.).

International Search Report, mailed Jul. 31, 2007, in corresponding International Application No. PCT/JP2007/063121.

Form PCT/ISA/220, mailed Jul. 31, 2007, in corresponding International Application No. PCT/JP2007/063121 (1 pg.).

Form PCT/ISA/237, mailed Jul. 31, 2007, in corresponding International Application No. PCT/JP2007/063121 (4 pp.).

Japanese Office Action for corresponding Japanese Application 2009-521438; mailed Jul. 5, 2011.

OPTICAL RECEIVING CIRCUIT

This application is a continuation of International Application No. PCT/JP2007/063121, filed Jun. 29, 2007, the disclosure of which is herein incorporated in its entirety by reference.

FIELD

The embodiments discussed herein are related to an optical receiving circuit that receives and demodulates an optical signal subjected to phase modulation and wavelength division multiplexing.

BACKGROUND

Schemes of wavelength division multiplexing (WDM) and dense wavelength division multiplexing (DWDM) for transmitting multiplexed optical signals of different wavelengths have been adopted to further expand communication capacity. In combination with the WDM scheme, a phase modulation scheme of correlating information with the phase of an optical signal has also been used.

The phase modulation scheme includes differential phase shift keying (DPSK) by which information is correlated with the degree of phase shift of an input signal, and phase shift keying (PSK) for coherent communication in which information is correlated with a difference in phase between an output signal from a local oscillator in an optical receiving device and an input signal. Hereinafter, PSK for coherent communication will be referred to as simply "PSK".

Under both phase modulation schemes in the receiving device, an intensity modulation (On-Off Keying (OOK)) signal is generated according to the difference in phase between a reference signal for phase comparison (an output signal from a local oscillator or a symbol just before an input signal) and an input signal. According to PSK, an OOK optical signal is generated by a mixer, such as optical coupler. According to DPSK, an OOK optical signal is generated by a one-symbol delay interferometer (demodulator).

In practical applications, DPSK is currently expected to be advantageous because DPSK is not easily affected by property-related fluctuations of an optical fiber serving as a transmission path and does not require a local oscillator. For example, a study of differential binary phase shift keying (DBPSK) and differential quadrature phase shift keying (DQPSK) has been in progress.

Among the above modulation schemes, DQPSK is characterized in that the expansion of the wavelength spectrum during modulation is small compared to other modulation schemes, such as DBPSK and OOK. For this reason, DQPSK enables WDM of a greater density and improved resistance to dispersion, and is thus expected to be a core technology aimed at long distance transmission systems having a larger capacity.

FIG. 14 is a block diagram of a conventional optical communication system. As depicted in FIG. 14, an optical communication system 1400 is an optical communication system that performs DQPSK communication for N multiplexed waves (wavelengths λ1 to λN). The optical communication system 1400 includes an optical transmitting device 1410 and an optical receiving device 1420. The optical transmitting device 1410 includes an optical transmitting circuit having N light sources 1411, N phase modulators 1412, and a wavelength multiplexer 1413.

The N light sources 1411 output beams of light of different wavelengths (λ1 to λN) to the N phase modulators 1412, respectively. The N phase modulators 1412 respectively modulate, by DQPSK, the beams of light output from the N light sources 1411. For example, the N phase modulators 1412 perform DQPSK modulation by shifting the phase of the light by four phase shift quantities (0°, 90°, 180°, 270°) corresponding to 2-bit information.

The N phase modulators 1412 output to the wavelength multiplexer 1413; modulated optical signals DQPSK(λ1) to DQPSK(λN). The wavelength multiplexer 1413 multiplexes the optical signals DQPSK(λ1) to DQPSK(λN) that are of different wavelengths and output from the N phase modulators 1412, and transmits the multiplexed optical signal DQPSK (λ1 to λN) to the optical receiving device 1420 via a transmission path such as an optical fiber.

The optical receiving device 1420 includes an optical receiving circuit having a wavelength separator 1421, N demodulators 1422, and N balanced receivers 1423. The wavelength separator 1421 demultiplexes (separates according to wavelength) the optical signal DQPSK (λ1 to λN) transmitted from the optical transmitting device 1410 through the transmission path and outputs the demultiplexed optical signals DQPSK(λ1) to DQPSK(λN) to the N demodulators 1422, respectively.

The N demodulators 1422 each include a delay interferometer, etc., and respectively extract from the optical signals DQPSK(λ1) to DQPSK(λN) output from the wavelength separator 1421, a positive-phase signal and a negative-phase signal for each channel (I-channel and Q-channel) as intensity modulation signals OOK (λ1, I-positive-phase) to OOK (λN, Q-negative-phase), and output the intensity modulation signals OOK (λ1, I-positive-phase) to OOK (λN, Q-negative-phase) to the N balanced receivers 1423, respectively.

The N balanced receivers 1423 are provided corresponding to each wavelength and channel, each performing balanced reception of a positive-phase signal and a negative-phase signal for a corresponding wavelength and channel among the intensity modulated signals OOK (λ1, I-positive-phase) to OOK (λN, Q-negative-phase) to demodulate the received signals. The present embodiments relate to an optical receiving circuit included in the optical receiving device 1420.

FIG. 15 is a block diagram of a configuration of part of a conventional optical receiving circuit. As depicted in FIG. 15, a conventional optical receiving circuit 1500 for DQPSK-based WDM includes N modulators 1520 disposed downstream from a wavelength separator 1510. The optical receiving circuit 1500 is thus generally configured to operate in such a way that the N demodulators 1520 receive optical signals DQPSK(λ1) to DQPSK(λN) separated according to wavelength by the wavelength separator 1510 (see, e.g., Japanese Patent Application Laid-Open Publication No. 2005-094287).

FIG. 16 is a block diagram of a configuration of a part of another conventional optical receiving circuit. As depicted in FIG. 16, a conventional optical receiving circuit 1600 for DQPSK-based WDM includes four wavelength separators 1620 disposed downstream from a demodulator 1610. The optical receiving circuit 1600 is thus configured to operate in such a way that four wavelength separators 1620, respectively separate according to wavelength, positive-phase signals and negative-phase signals for each channel (I-positive-phase to Q-negative-phase) extracted by the demodulator 1610 from an optical signal DQPSK (λ1 to λN) (see, e.g., Japanese Patent Application Laid-Open Publication No. 2006-246471).

The configuration of the optical receiving circuit 1500 of FIG. 15, however, requires the same number of demodulators 1520 as the number of multiplexed waves N, which may amount to about 100 in DWDM. The configuration of the optical receiving circuit 1500 of FIG. 15, therefore, invites an increase in the size of the optical receiving circuit 1500 as the number of multiplexed waves N increases. This leads to a problem in that the cost of the optical receiving circuit 1500 increases.

According to the configuration of the optical receiving circuit 1500 of FIG. 15, a delay rate at each of the demodulators 1520 equivalent in quantity to the multiplexed waves N has to be set for each corresponding wavelength. This leads to a problem of a further increase in the cost of the optical receiving circuit 1500. The configuration of the optical receiving circuit 1600 of FIG. 16 poses a problem in that optical cables between the wavelength separators 1620 and the balanced receivers cross each other.

FIG. 17 is a block diagram of an optical receiving circuit to which the optical receiving circuit of FIG. 16 has been applied. As depicted in FIG. 17, plural wavelength separators 1620 are disposed downstream from the demodulator 1610. In this configuration, among signals output from the demodulator 1610, a positive-phase signal and a negative-phase signal to be input to the same balanced receiver 1710 (hereinafter "corresponding positive-phase signal and negative-phase signal") are separately input to different wavelength separators 1620.

As a result, the corresponding positive-phase signal and the negative-phase signal are output from positions separated from each other, which causes one set of optical cables 1720 transmitting the corresponding positive-phase signal and negative-phase signal intercross between the wavelength separators 1620 and balanced receiver 1710. This arises in a problem that uniforming the optical lengths of the set of optical cables 1720 transmitting the corresponding positive-phase signal and negative-phase signal is difficult.

When the optical lengths of the set of optical cables 1720 transmitting the corresponding positive-phase signal and negative-phase signal are not uniform, the positive-phase signal and the negative-phase signal are input to the balanced receiver 1710 at different times relative to each other. This leads to a problem of a decline in the precision of demodulation by the balanced receiver 1710.

For example, if a difference in the timing of input of the corresponding positive-phase signal and negative-phase signal to the balanced receiver 1710 becomes 0.2 times (or more) the modulation period, optical signal noise ratio (OSNR) deteriorates (see, e.g., "IEEE Photonics Technology Letters", Sep. 2003, Vol. 15, No. 9, pp. 1282-1284).

For example, when DQPSK-based communication at a transmission rate of 40 Gb/s is performed, to keep the difference in input timing of the corresponding positive-phase signal and negative-phase signal to the balanced receiver 1710 equal to or lower than 0.2 times the modulation period to avoid deterioration of the OSNR, an optical length difference between the optical cables 1720 must be kept within a range of ±2 mm. The precision of the length of a commercial optical fiber is approximately +100 mm to −0 mm, which does not meet the demanded precision for optical investigations.

If the optical cables 1720 between the wavelength separators 1620 and the balanced receiver 1710 cross each other and become complicated, another problem arises in that efficient integration of the optical receiving circuit 1600 and maintenance work, such as replacement of the optical cable 1720 between the wavelength separator 1620 and the balanced receiver 1710 and addition of another channel (wavelength), become difficult.

FIG. 18 is a block diagram of optical connectors used for a conventional optical receiving circuit. As depicted in FIG. 18, because optical signals output from the demodulator 1610 are separately input to different wavelength separators 1620 in the optical receiving circuit 1600 of FIG. 16, the optical cables 1720 transmitting these signals must be individually connected with optical connectors 1820. Because one set of optical cables 1720 transmitting the corresponding positive-phase signal and negative-phase signal are arranged crossing each other, the optical cables 1720 are connected individually with optical connectors 1830.

If the number of multiplexed waves is 32, the optical receiving circuit 1600 needs 1 optical connector 1810 upstream from the demodulator 1610, 4 optical connectors 1820, and 128 optical connectors 1830, thus requiring 133 optical connectors in total. The optical receiving circuit 1600 thus needs a multiplicity of optical connectors, which increases the size of the optical receiving circuit 1600, leading to a problem of an increase in the cost of the optical receiving circuit 1600.

The above problems also arise when PSK-based communication is performed. When an optical receiving circuit for PSK has a configuration such that plural mixers (equivalent to demodulators for DPSK) are disposed downstream from a wavelength separator, the optical receiving circuit needs mixers equivalent in quantity to the number of multiplexed waves N, which leads to a problem of an increase in the size and cost of the optical receiving circuit.

When an optical receiving circuit for PSK is configured to have wavelength separators downstream from a mixer, one set of optical cables 1720 transmitting a corresponding positive-phase signal and negative-phase signal cross each between the wavelength separators and a balanced receiver. This poses a problem of lower demodulation precision and difficulty in maintenance.

SUMMARY

According to an aspect of an embodiment, an optical receiving circuit that receives and demodulates an optical signal subjected to phase modulation and wavelength division multiplexing. The optical receiving circuit includes an interfering unit that causes a reference signal for phase comparison to interfere with the optical signal to output resulting signals as positive-phase signals and negative-phase signals; and a wavelength separator having plural input ports receiving the positive-phase signals and the negative-phase signals, the positive-phase signals and negative-phase signals being adjacent to each other. The wavelength separator further has plural output ports, and separates according to wavelength, the positive-phase signals and the negative-phase signals, and from the output ports, outputs for each wavelength, a separated positive-phase signal and negative-phase signal in a state of being adjacent to each other. The optical circuit further includes balanced receivers respectively provided for each wavelength, where a given balanced receiver for a given wavelength performs balanced reception and demodulation of the separated positive-phase signal and negative phase signal of the given wavelength.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to the accompanying drawings.

Figure 1:
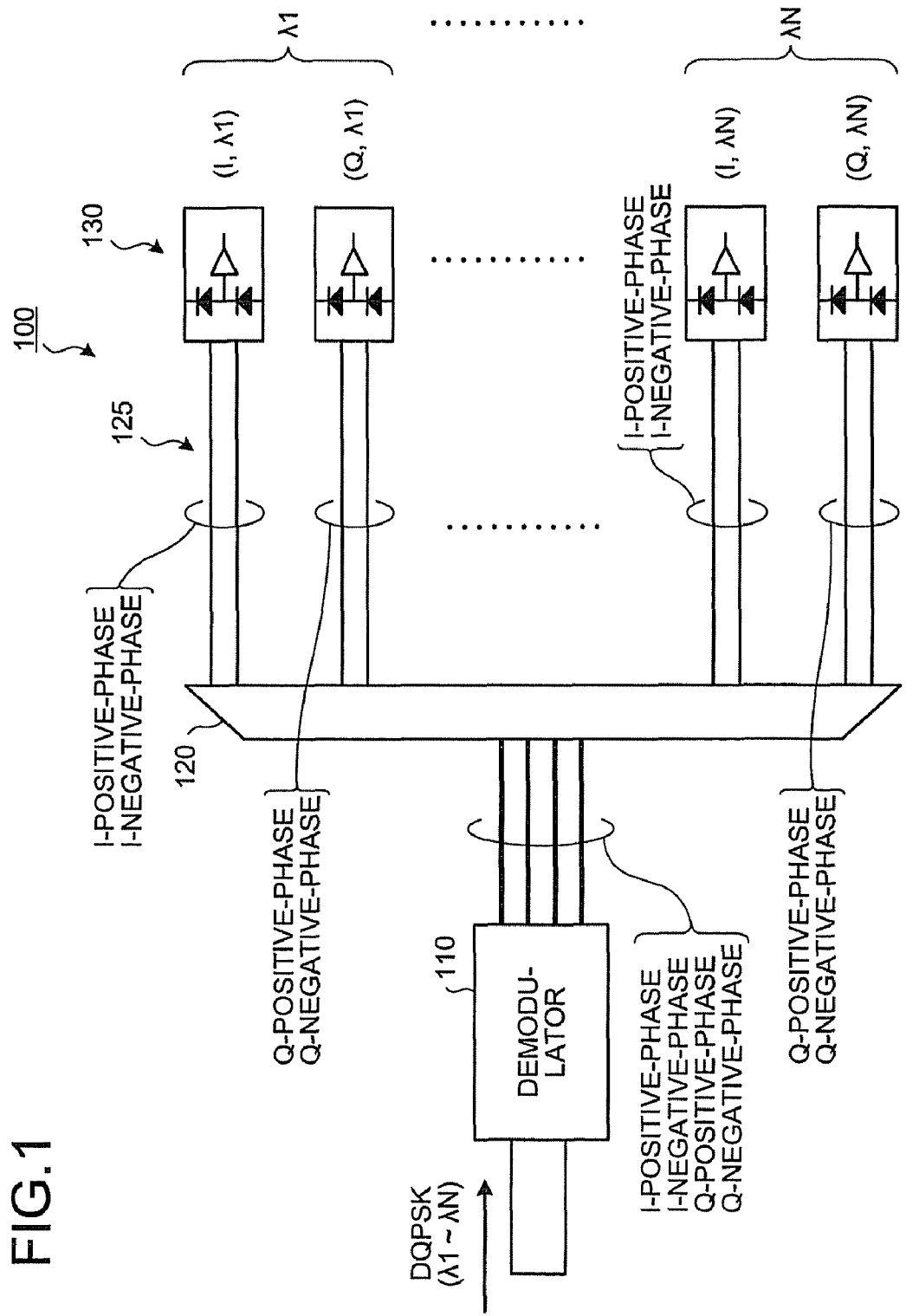
FIG. 1 is a block diagram of a functional configuration of an optical receiving circuit according to a first embodiment.

FIG. 1 is a block diagram of a functional configuration of an optical receiving circuit according to a first embodiment. An optical receiving circuit 100 according to the first embodiment is an optical receiving circuit that receives and demodulates an optical signal subjected to DQPSK modulation and to WDM for a number of multiplexed waves N (wavelengths $\lambda 1$ to $\lambda N$). As depicted in FIG. 1, the optical receiving circuit 100 includes a demodulator 110, a wavelength separating unit 120, optical cables 125, and balanced receivers 130.

The demodulator 110 causes a reference signal for phase comparison to interfere with a received optical signal and extracts a positive-phase signal and a negative-phase signal for the I-channel and a positive-phase signal and a negative-phase signal for the Q-channel as OOK optical signals, from the received optical signal DQPSK ($\lambda 1$ to $\lambda N$) and outputs the extracted OOK optical signals to the wavelength separating unit 120.

In FIG. 1, the positive-phase signal and the negative-phase signal for the I-channel and the positive-phase signal and the negative-phase signal for the Q-channel are represented as "I-positive-phase", "I-negative-phase", "Q-positive-phase", and "Q-negative-phase", respectively (the same representation will be used hereinafter). The wavelength separating unit 120 separates the optical signals (I-positive-phase to Q-nega-tive-phase) output from the demodulator 110 according to wavelength and outputs the separated optical signals to the balanced receivers 130 via the optical cables 125, respectively.

At this time, a positive-phase signal and a negative-phase signal corresponding to each other are output in a state of being adjacent to each other, from the wavelength separating unit 120. I-channel signals (set of a positive-phase signal and a negative-phase signal) and Q-channel signals (set of a positive-phase signal and a negative-phase signal) included in one channel (wavelength) (hereinafter "corresponding I-channel signals and Q-channel signals") may be output in a state of being adjacent to each other, from the wavelength separating unit 120.

Optical signals are thus output from the wavelength separating unit 120 in order of an I-channel positive-phase signal ($\lambda 1$), an I-channel negative-phase signal ($\lambda 1$), a Q-channel positive-phase signal ($\lambda 1$), a Q-channel negative-phase signal ($\lambda 1$), . . . , an I-channel positive-phase signal ($\lambda N$), an I-channel negative-phase signal ($\lambda N$), a Q-channel positive-phase signal ($\lambda N$), and a Q-channel negative-phase signal ($\lambda N$).

The balanced receivers 130 are provided in correspondence to each wavelength and channel. In FIG. 1, among the balanced receivers 130, a balanced receiver corresponding to an I-channel wavelength $\lambda k$ is represented as (I, $\lambda k$), and a balanced receiver corresponding to a Q-channel wavelength $\lambda k$ is represented as (Q, $\lambda k$) (the same representation will be used hereinafter).

For example, the I-channel positive-phase signal ($\lambda 1$) and the I-channel negative-phase signal ($\lambda 1$) are input to a balanced receiver (I, $\lambda 1$). The Q-channel positive-phase signal ($\lambda N$) and the Q-channel negative-phase signal ($\lambda N$) are input to a balanced receiver (Q, $\lambda N$). The balanced receivers 130 (I, 1), . . . , (Q, N) each perform balanced reception of input of a positive-phase signal and a negative-phase signal to demodulate the received signals.

Figure 2:
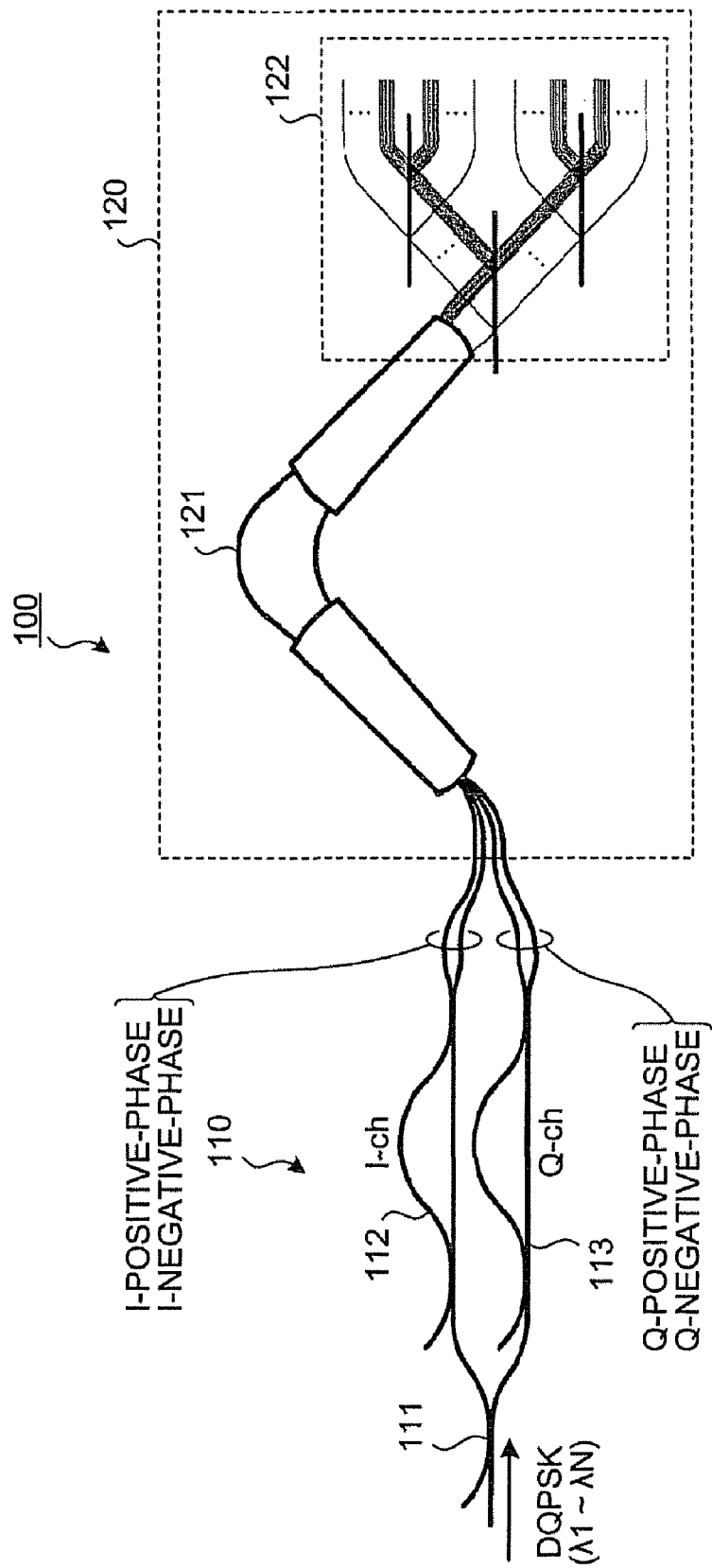
FIG. 2 is a block diagram of a demodulator and a wavelength separating unit of the optical receiving circuit.

FIG. 2 is a block diagram of the demodulator and the wavelength separating unit of the optical receiving circuit. As depicted in FIG. 2, the demodulator 110 for DQPSK includes a branching unit 111, an I-channel delay interferometer 112, and a Q-channel delay interferometer 113. The branching unit 111 branches a received optical signal DQPSK ($\lambda 1$ to $\lambda N$) and outputs the resulting branched optical signals to the I-channel delay interferometer 112 and the Q-channel delay interferometer 113.

The I-channel delay interferometer 112 branches the optical signal from the branching unit 111 and induces a delay equivalent to one symbol and a positive phase of 45° to one of resulting branched optical signals. The I-channel delay interferometer 112 causes the delayed branched optical signal to interfere with the other branched optical signal to extract an I-channel positive-phase signal and an I-channel negative phase signal. The I-channel delay interferometer 112 then outputs the extracted I-channel positive-phase signal and I-channel negative-phase signal to the wavelength separating unit 120.

The Q-channel delay interferometer 113 branches the optical signal output from the branching unit 111 and induces a delay equivalent to one symbol and a negative phase of 45° to one of the resulting branched optical signals. The Q-channel delay interferometer 113 causes the delayed branched optical signal to interfere with the other branch optical signal to extract a Q-channel positive-phase signal and a Q-channel negative phase signal. The Q-channel delay interferometer 113 then outputs the extracted Q-channel positive-phase signal and Q-channel negative-phase signal to the wavelength separating unit 120.

The wavelength separating unit 120 includes an AWG 121 and an interleaver 122. The AWG 121 receives the I-channel positive-phase signal and I-channel negative-phase signal from the I-channel delay interferometer 112, and the Q-channel positive-phase signal and Q-channel negative-phase signal from the Q-channel delay interferometer 113. Each set of the corresponding positive-phase signal and negative-phase signal are input in a state of being adjacent to each other, to the AWG 121. For example, the optical signals are input to the AWG 121 in the order of the I-channel positive-phase signal, the I-channel negative-phase signal, the Q-channel positive-phase signal, and the Q-channel negative-phase signal.

The AWG 121 has plural input ports, to which the positive-phase signals and negative-phase signals corresponding to each other output from the demodulator 110 are input in a state of being adjacent to each other, and further has plural output ports. The AWG 121 separates, according to wavelength, the input optical signals into sets of a positive-phase signal and a negative-phase signal that correspond to each other and outputs the separated sets of signals for each wavelength from the output ports shifted according to wavelength.

At this time, the AWG 121 outputs the positive-phase signals and negative-phase signals corresponding to each other from the output ports while keeping both signals in a state of being adjacent to each other for each wavelength. The optical signals output from the AWG 121 are output to the interleaver 122, which then branches the signals output from the AWG 121 according to wavelength and outputs the respective branched signals to the balanced receivers 130.

Figure 3:
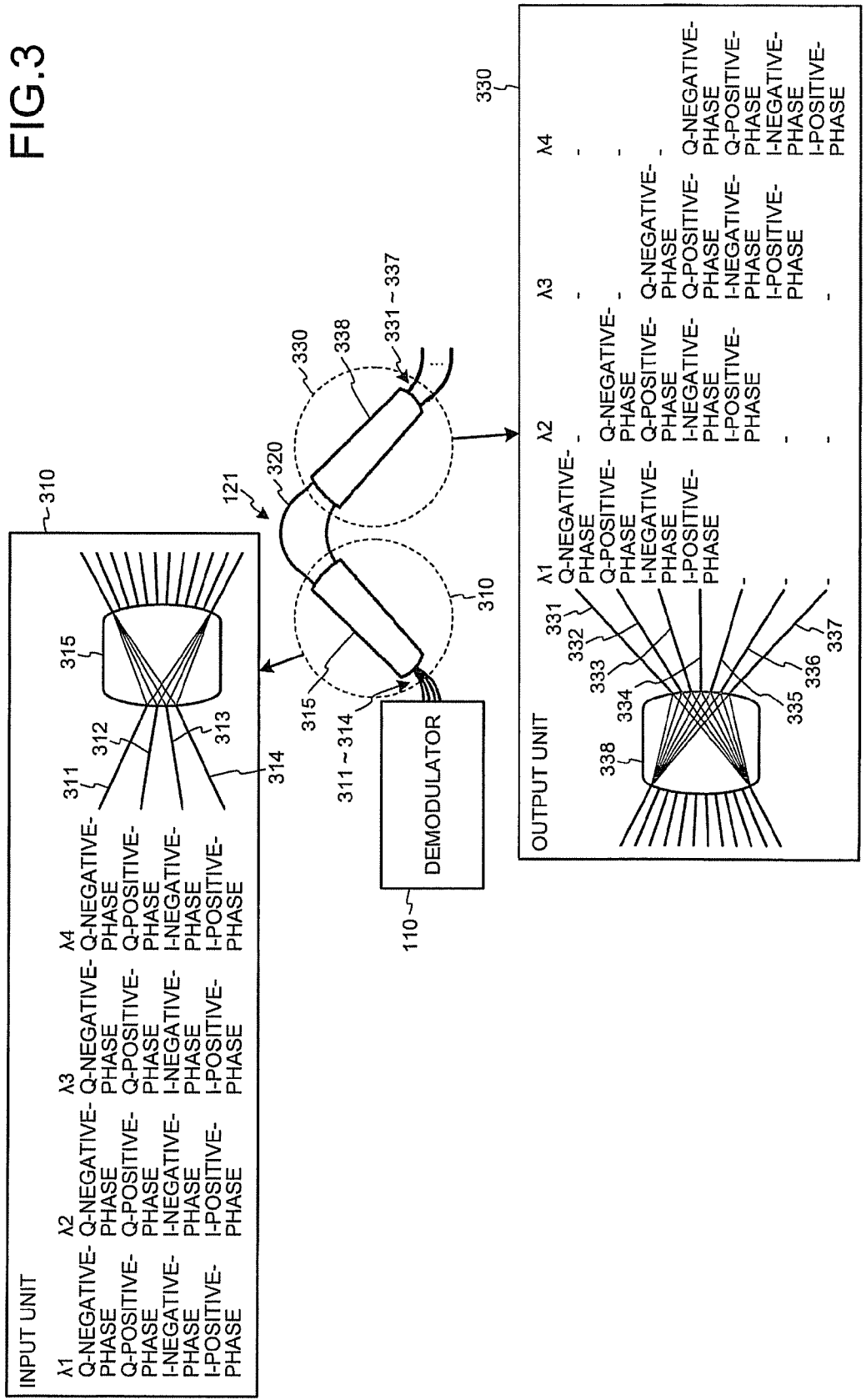
FIG. 3 is a schematic of an arrayed waveguide grating (AWG) of the wavelength separating unit of the optical receiving circuit.

FIG. 3 is a schematic of the AWG of the wavelength separating unit of the optical receiving circuit. As depicted in FIG. 3, the AWG 121 included in the wavelength separating unit 120 of the optical receiving circuit 100 has an input unit 310, a channel waveguide 320, and an output unit 330. It is assumed that the optical receiving circuit 100 receives an optical signal subjected to WDM with the number of multiplexed waves 4 (λ1 to λ4). The input unit 310 includes input ports 311 to 314 and an input side slub 315.

The input ports 311 to 314 output optical signals from the demodulator 110 to the input side slub 315. The input side slub 315 is the flat optical waveguide that outputs respective optical signals from the input ports 311 to 314 to the channel waveguide 320.

The channel waveguide 320 includes optical waveguides slightly different in length from each other. The channel waveguide 320 transmits respective optical signals from the input unit 310 to the output unit 330. The output unit 330 includes an output side slub 338 and output ports 331 to 337.

The output side slub 338 is the flat optical waveguide that outputs respective optical signals from the channel waveguide 320 to the output ports 331 to 337. The output ports 331 to 337 output respective optical signals from the output side slub 338 to the interleaver 122.

Intervals between the input ports 311 to 314 at a portion connected to the input side slub 315 are determined to be equal to intervals between the output ports 331 to 337 at a portion connected to the output side slub 338. As a result, if a port receiving an incoming optical signal among the input ports 311 to 314 is shifted, a port outputting the optical signal among the output ports 331 to 337 is shifted.

Because of the properties of the AWG 121, optical signals of adjacent wavelengths are output from adjacent output ports. An example will be described, where among optical signals output from the demodulator 110, Q-channel negative-phase signals (λ1 to λ4) are input to the input port 311, Q-channel positive-phase signals (λ1 to λ4) are input to the input port 312, I-channel negative-phase signals (λ1 to λ4) are input to the input port 313, and I-channel positive-phase signals (λ1 to λ4) are input to the input port 314.

In this example, the Q-channel negative-phase signal (λ1) is output from the output port 331, the Q-channel positive-phase signal (λ1) and the Q-channel negative-phase signal (λ2) are output from the output port 332, and the I-channel negative-phase signal (λ1), the Q-channel positive-phase signal (λ2), and the Q-channel negative-phase signal (λ3) are output from the output port 333.

The I-channel positive-phase signal (λ1), the I-channel negative-phase signal (λ2), the Q-channel positive-phase signal (λ3), and the Q-channel negative-phase signal (λ4) are output from the output port 334. The I-channel positive-phase signal (λ2), the I-channel negative-phase signal (λ3), and the Q-channel positive-phase signal (λ4) are output from the output port 335. The I-channel positive-phase signal (λ3) and the I-channel negative-phase signal (λ4) are output from the output port 336. The I-channel positive-phase signal (λ4) is output from the output port 337.

In this manner, respective optical signals kept adjacent to each other and input to the input ports 311 to 314 of the AWG 121 are output in a state of being adjacent to each other, from output ports shifted for each wavelength (shifted by one port per one channel) among the output ports 331 to 337. When a positive-phase signal and a negative-phase signal corresponding to each other are input, to the AWG 121, in a state of being adjacent to each other, the positive-phase signal and the negative-phase signal corresponding to each other can be separated and output in a state of being adjacent to each other.

Figure 4:
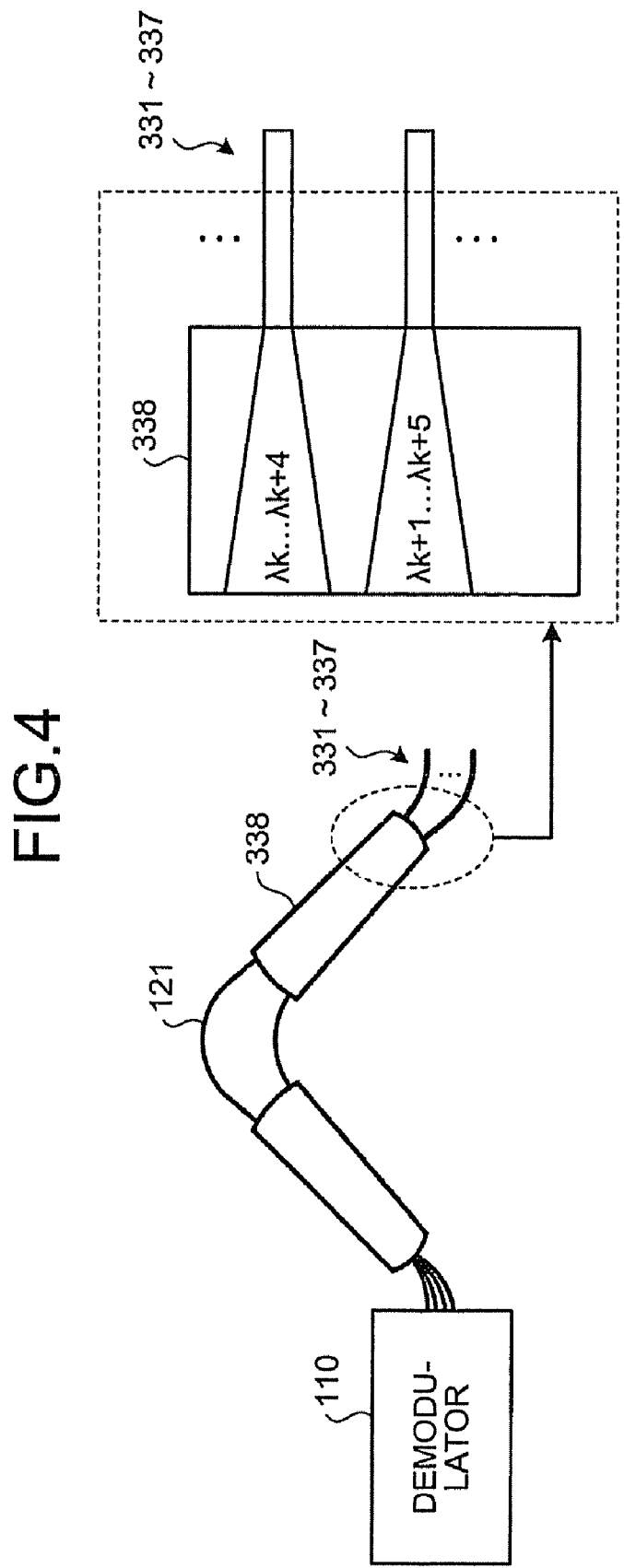
FIG. 4 is a schematic of an output side slub of the AWG.

FIG. 4 is a schematic of the output side slub of the AWG. In an optical switch utilizing the cyclicality of the AWG, in general, plural output ports connected to the output side slub are arranged within an interval of one wavelength. According to the AWG 121 of the optical receiving circuit 100 of the present embodiments, however, each of the output ports 331 to 337 connected to the output side slub 338 is disposed for one wavelength interval (λk, λk+1, . . . ), as depicted in FIG. 4.

Figure 5:
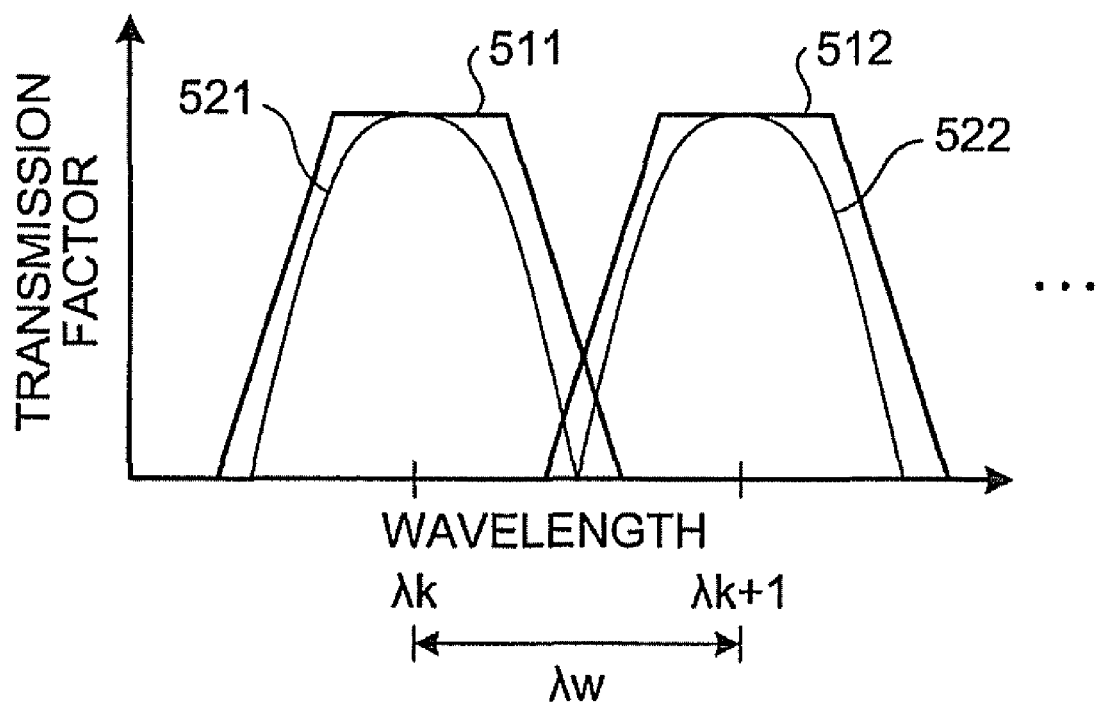
FIG. 5 is a graph of transmission factor characteristics of the AWG and wavelength spectra of optical signals.

FIG. 5 is a graph of transmission factor characteristics of the AWG and the wavelength spectra of optical signals. In FIG. 5, reference numerals 511 and 512 denote the transmission factor characteristics (filter characteristics) of the waveguides (WG) of the AWG 121. The transmission factor characteristics 511 and 512 correspond to wavelengths λk and λk+1, respectively.

Reference numerals 521 and 522 denote the wavelength spectra of optical signals output from the AWG 121. The wavelength spectra 521 and 522 correspond to the wavelengths λk and λk+1, respectively. As depicted in FIG. 5, each interval λw between wavelengths resulting from wave division by the AWG 121 is determined so that the transmission factor characteristics (filter characteristics) 511, 512, . . . correspond to the wavelength spectra 521, 522, . . . in a one-to-one correspondence.

For example, a transmission wavelength band at the output ports 331 to 337 of the AWG 121 is determined to be a width in which an OOK signal having a bit rate equal to the symbol rate of an optical signal received by the optical receiving circuit 100 can be stored. If a minimum wavelength interval necessary for storage of the OOK signal is Δλmin, each interval λw between wavelengths resulting from wave division by the AWG 121 is equal to or more than Δλmin.

Figure 6:
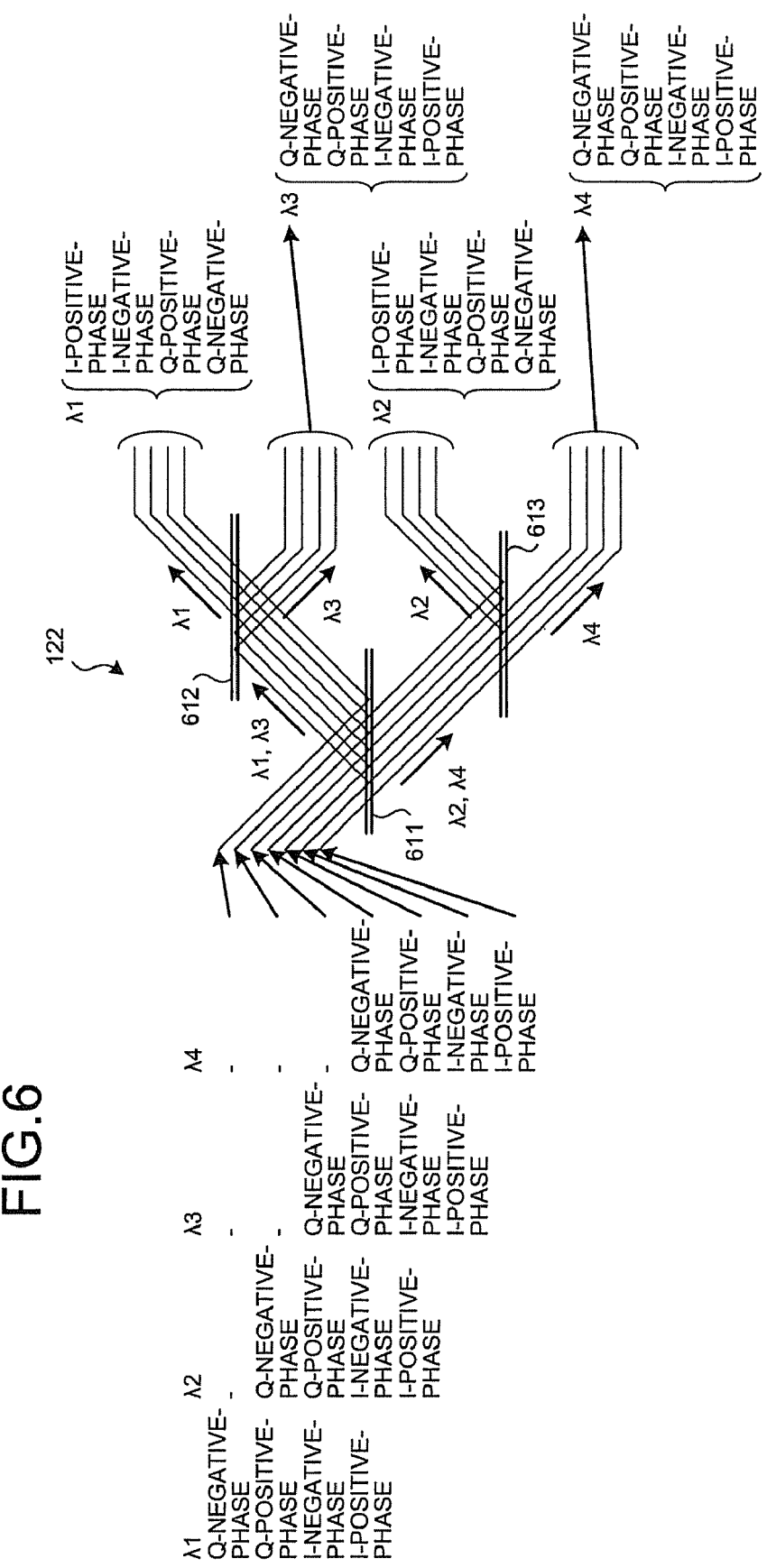
FIG. 6 is a schematic of an interleaver of the wavelength separating unit of the optical receiving circuit.

FIG. 6 is a schematic of the interleaver of the wavelength separating unit of the optical receiving circuit. As depicted in FIG. 6, the interleaver 122 of the wavelength separating unit 120 is a multifilm filter having plural filter films 611 to 613. The filter film 611 receives parallel optical signals (λ1 to λ4)

output from the AWG 121. The transmission characteristic of the filter film 611 is set so that among the signals incident on the filter film 611, signal components of wavelengths λ2 and λ4 are transmitted while signal components of wavelengths λ1 and λ3 are reflected.

The filter film 612 receives the signal components (λ1, λ3) that have been reflected by the filter film 611. The transmission characteristic of the filter film 612 is set so that among the signals incident on the filter film 612, the signal component of wavelength λ1 is transmitted while the signal component of wavelength λ3 is reflected. The filter film 613 receives the signal components (λ2, λ4) that have been transmitted through the filter film 611.

The transmission characteristic of the filter film 613 is set so that among the signals incident on the filter film 613, the signal component of wavelength λ4 is transmitted while the signal component of wavelength λ2 is reflected. In this manner, the interleaver 122 branches input optical signals to expand each wavelength interval between the optical signals into an interval four times the original interval and thus separates the input optical signals for each wavelength to output the separated optical signals.

The filter film 611 may be disposed so that the incident angle of an optical signal incident on the filter film 611 is about 45°, and the filter films 612 and 613 may be disposed to be parallel with the filter film 611. In this configuration, the incident signals and the reflected signals are perpendicular to each other (cross each other at right angles) at the filters 611 to 613. This suppresses the occurrence of crosstalk.

When the optical signals output from the AWG 121 in the order of arrangement depicted in FIG. 3 are input to the interleaver 122, the optical signals are branched to have wavelength intervals four times as wide as the original wavelength intervals, and are output from the interleaver 122 in the order of the I-channel positive-phase signal (λ1), the I-channel negative-phase signal (λ1), the Q-channel positive-phase signal (λ1), the Q-channel negative-phase signal (λ1), ..., the I-channel positive-phase signal (λ4), the I-channel negative-phase signal (λ4), the Q-channel positive-phase signal (λ4), and the Q-channel negative-phase signal (λ4).

Figure 7:
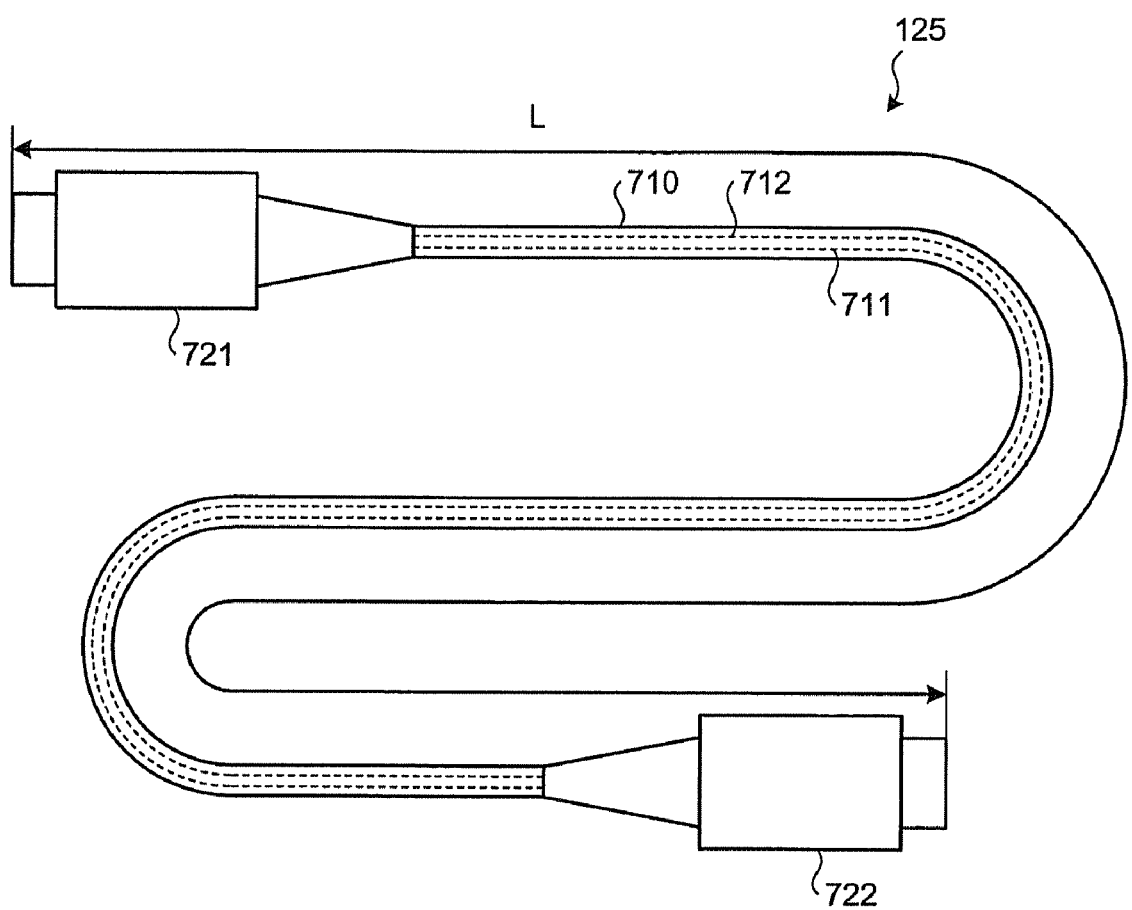
FIG. 7 is a schematic an optical cable connecting the wavelength separating unit and a balanced receiver in the optical receiving circuit.

FIG. 7 is a schematic the optical cable connecting the wavelength separating unit to the balanced receiver in the optical receiving circuit. According to the optical receiving circuit 100 of the present embodiments, a positive-phase signal and a negative phase signal corresponding to each other are output in a state of being adjacent to each other, from the wavelength separating unit 120. For this reason, the optical cable 125 connecting the wavelength separating unit 120 to the balanced receiver 130 (see FIG. 1) can be provided as a taped fiber. In this case, the optical cable 125 includes a cable unit 710 and optical connector units 721 and 722 disposed at terminal ends of the cable unit 710.

Inside the optical cable 125, two optical fibers 711 and 712 are laid parallel with each other, so that these two optical fibers 711 and 712 make up a set of optical lines transmitting a positive-phase signal and a negative-phase signal that correspond to each other. When an optical fiber with a connector is manufactured, in general, even if attachment of an optical connector unit is defective, the yield of the optical fiber can be improved by severing the optical connector unit and reattaching the optical connector, regardless of whether the optical fiber has a single core or multiple cores.

To enable such an improvement, an extra length of about 100 mm is added to a target length to make an optical fiber greater in length, to which an optical connector is attached in many cases. If a single-core optical fiber is used to make up the optical cable between the wavelength separating unit 120 and the balanced receiver 130, an extra length for reattachment of the optical connector becomes an error in an optical path length, thereby making it difficult to maintain the difference between optical path lengths for the positive-phase signal and the negative-phase signal corresponding to each other to be within a range of ±2 mm, the demanded precision.

In the example of the optical cable 125, two optical fibers 711 and 712 are severed simultaneously, which facilitates uniforming the optical path lengths for the positive-phase signal and the negative-phase signal corresponding to each other for adjustment. For example, when the optical cable 125 is provided under conditions of a fiber pitch of 250 μm and leading edge grinding precision (connector facet angle precision) of ±0.5 degrees, even if the length precision of the optical cable 125 as a whole is given as a margin for error of +100 mm to −0 mm, the precision of the difference between the lengths of the optical path for the two optical fibers 711 and 712 incorporated in the optical 125 is given as a margin for error of ±5 μm, sufficiently satisfying the demanded precision of the optical path length difference of ±2 mm.

Figure 8:
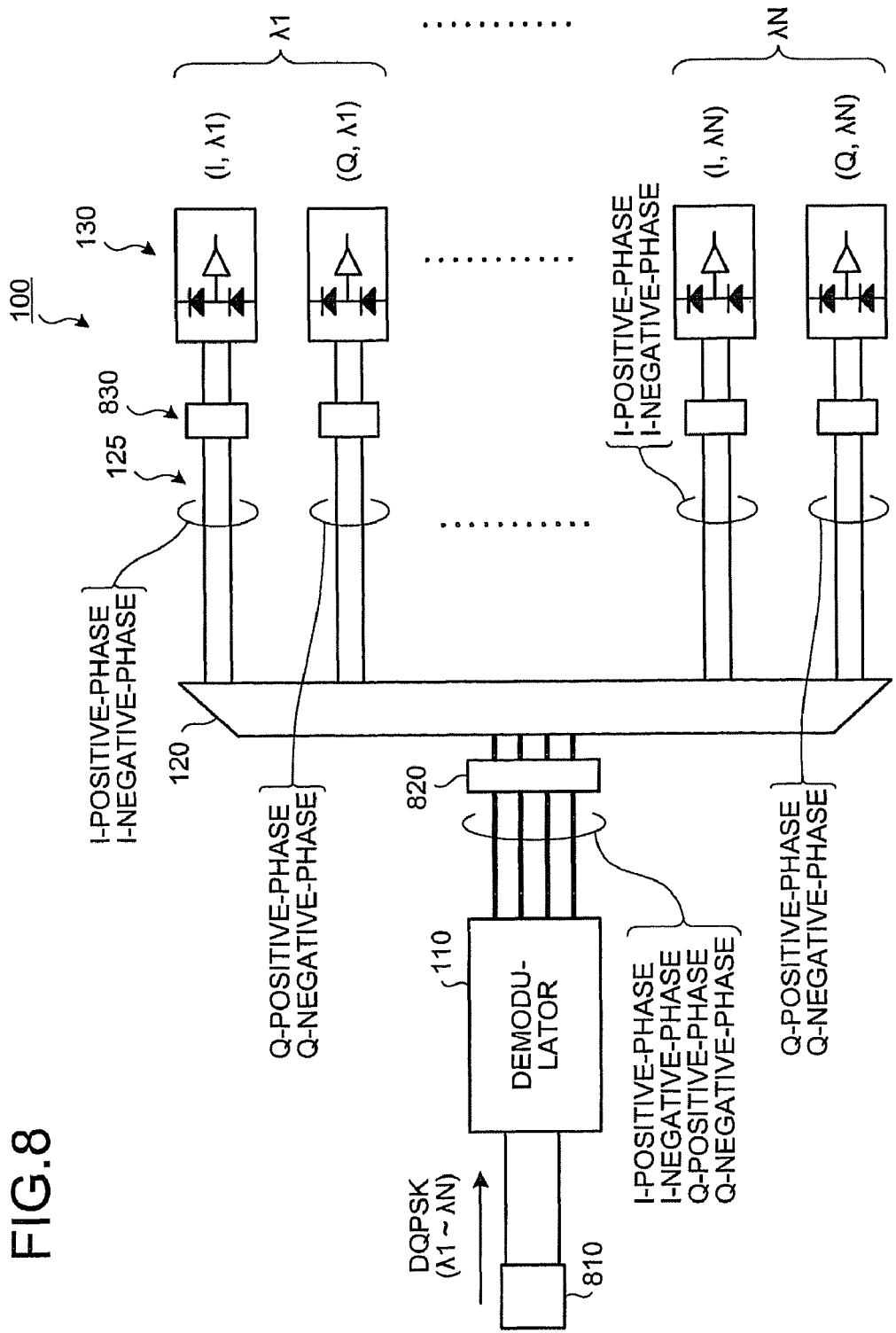
FIG. 8 is a block diagram of optical connectors used for the optical receiving circuit.

FIG. 8 is a block diagram of optical connectors used for the optical receiving circuit. In FIG. 8, reference numerals 810, 820, and 830 denote optical connectors connecting optical cables for the units of the optical receiving circuit 100. The optical connector 810 connects to the demodulator 110, a receiving unit of an optical receiving device that includes the optical receiving circuit 100. The optical connector 820 connects the demodulator 110 to the wavelength separating unit 120. The optical connectors 830 connect the wavelength separating unit 120 to the balanced receivers 130.

According to the present embodiments, respective optical signals output from the demodulator 110 are input to a single unit of the wavelength separating unit 120, and the optical cables 125 transmitting these signals can be connected all together via a single unit of the optical connector 820. This enables a reduction in the number of the optical connectors 820 disposed between the demodulator 110 and the wavelength separating unit 120.

According to the present embodiments, one set of the optical cables 125 transmitting a positive-phase signal and a negative-phase signal corresponding to each other are laid to be adjacent to each other, and each set of the optical cables 125 are connected collectively via a single unit of the optical connector 830. This enables a reduction in the number of the optical connectors 830 disposed between the wavelength separating unit 120 and the balanced receivers 130.

Figure 18:
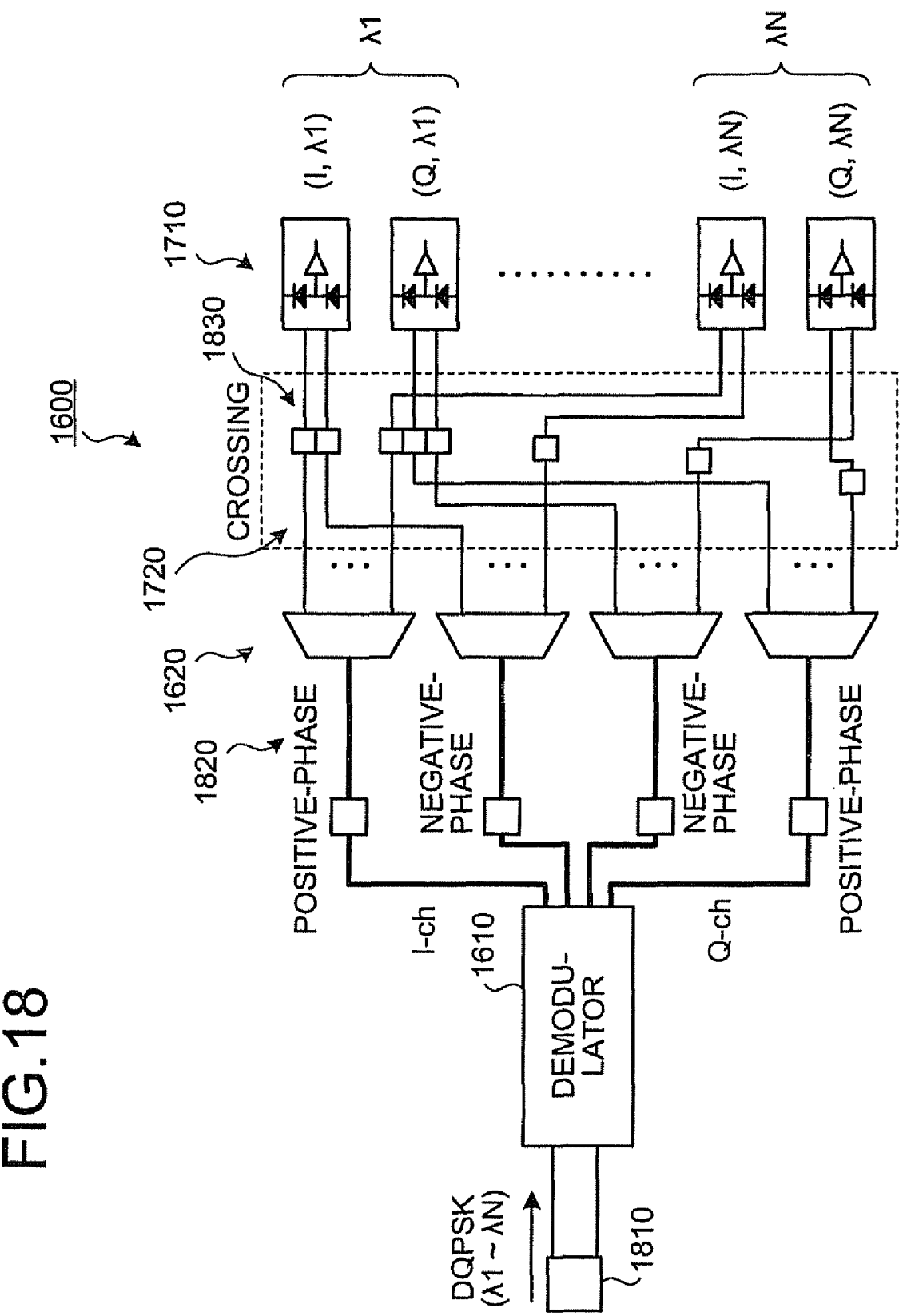
FIG. 18 is a block diagram of optical connectors used for a conventional optical receiving circuit.

If the number of multiplexed waves is, for example, 32, the optical receiving circuit 100 employs 1 optical connector 810, 1 optical connector 820, and 64 optical connectors 830, thus requiring 66 optical connectors in total. The number of connectors employed by the optical receiving circuit 100 is thus reduced substantially, compared to the number of connectors employed by a conventional optical receiving circuit (see FIG. 18).

Figure 9:
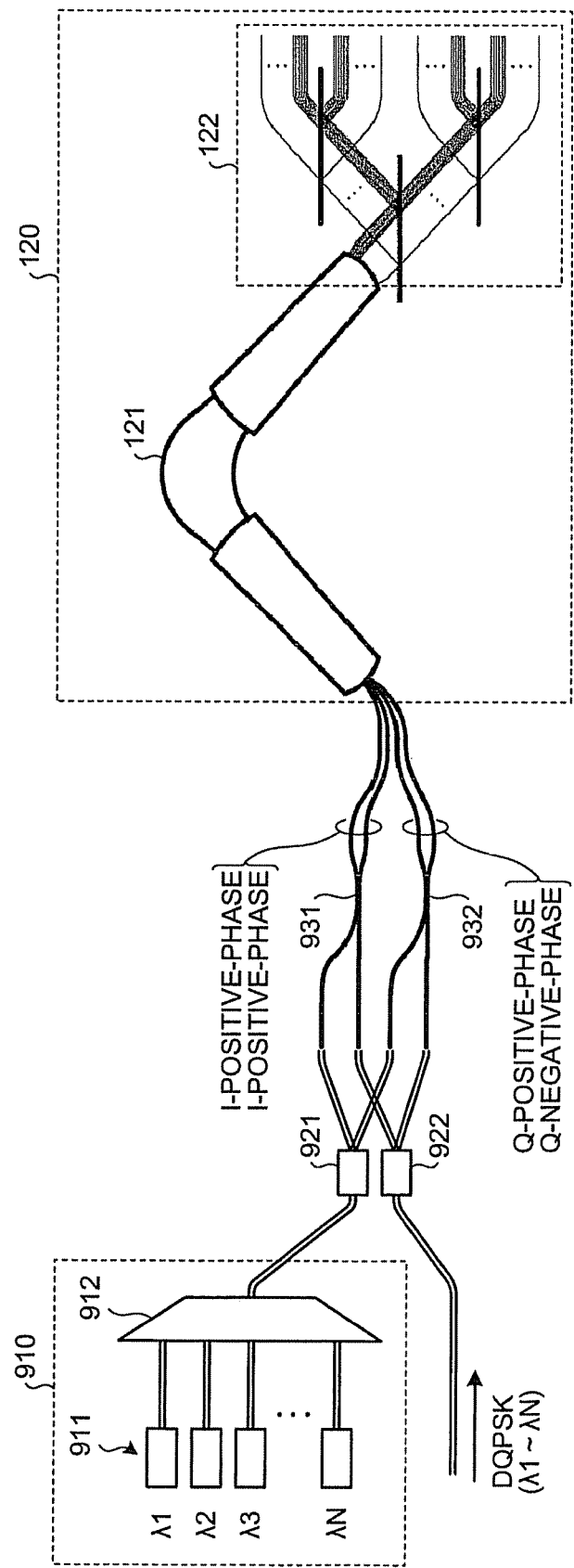
FIG. 9 is a block diagram of a modification of the optical receiving circuit according to the first embodiment.

FIG. 9 is a block diagram of a modification of the optical receiving circuit according to the first embodiment. A modified optical receiving circuit 100 that receives an optical signal subjected to PSK modulation (coherent communication) will be described. In FIG. 9, constituent elements identical to those depicted in FIG. 2 are denoted by the same reference numerals used in FIG. 2, and are omitted in further description. As depicted in FIG. 9, the modified optical receiving circuit 100 includes a local oscillating unit 910, optical couplers 921 and 922, an I-channel mixer 931, and a Q-channel mixer 932 that are provided in place of the demodulator 110.

The local oscillating unit 910 has plural local oscillators 911 and a wavelength multiplexer 912. The local oscillators 911 output beams of light of different wavelengths (λ1 to λN) to the wavelength multiplexer 912. The wavelength multiplexer 912 multiplexes the beams of light from the local oscillators 911 and outputs multiplexed light to the optical coupler 921.

The optical coupler 921 branches light from the local oscillating unit 910 and outputs the branched light to the I-channel mixer 931 and to the Q-channel mixer 932. The optical coupler 922 branches an optical signal QPSK (λ1 to λN) received by the optical receiving circuit 100 and outputs the branched optical signals to the I-channel mixer 931 and to the Q-channel mixer 932, respectively.

The I-channel mixer 931 causes the light from the optical coupler 921 to interfere with the optical signal from the optical coupler 922 by inducing a positive phase difference of 45° between the light and the optical signal to extract an I-channel positive-phase signal and an I-channel negative-phase signal. The I-channel mixer 931 outputs the extracted I-channel positive-phase signal and I-channel negative-phase signal to the wavelength separating unit 120.

The Q-channel mixer 932 causes the light from the optical coupler 921 to interfere with the optical signal from the optical coupler 922 by inducing a negative phase difference of 45° between the light and the optical signal to extract a Q-channel positive-phase signal and a Q-channel negative-phase signal. The Q-channel mixer 932 outputs the extracted Q-channel positive-phase signal and Q-channel negative-phase signal to the wavelength separating unit 120.

The phase of the optical signal output from the local oscillating unit 910 is synchronized with the phase of the optical signal QPSK (λ1 to λN) received by the optical receiving circuit 100. The optical coupler 921, the optical coupler 922, the I-channel mixer 931, and the Q-channel mixer 932 are provided as, for example, a 3 dB coupler. The modification of the optical receiving circuit 100 is thus capable of receiving an optical signal subjected to PSK modulation (coherent communication).

In this manner, the optical receiving circuit 100 according to the first embodiment has a configuration such that the wavelength separating unit 120 is disposed downstream from the demodulator 110. In this configuration, the number of employed demodulators 110 does not increase even if the number of multiplexed waves N increases. This enables a reduction in the size and cost of the optical receiving circuit 100.

When the wavelength separator includes the AWG 121, etc., and respective output signals from the demodulator 110 are input to a single unit of the wavelength separator, a positive-phase signal and a negative-phase signal that correspond to each other and are to be input to the same balanced receiver 130 can be output in a state of being adjacent to each other. Because of this, optical path lengths for the positive-phase signal and the negative-phase signal corresponding to each other can be easily uniformed, thereby improving the demodulation precision of the optical receiving circuit 100.

The optical cables 125 between the wavelength separating unit 120 and the balanced receivers 130 do not cross each other. This enables efficient integration of the optical receiving circuit 100 and facilitates maintenance work, such as replacement of the optical cables 125 between the wavelength separating unit 120 and the balanced receivers 130 and addition of an extra channel (wavelength). In addition, the number of optical connectors employed by the optical receiving circuit 100 is reduced substantially. This enables a reduction in the size and cost of the optical receiving circuit 100.

Figure 10:
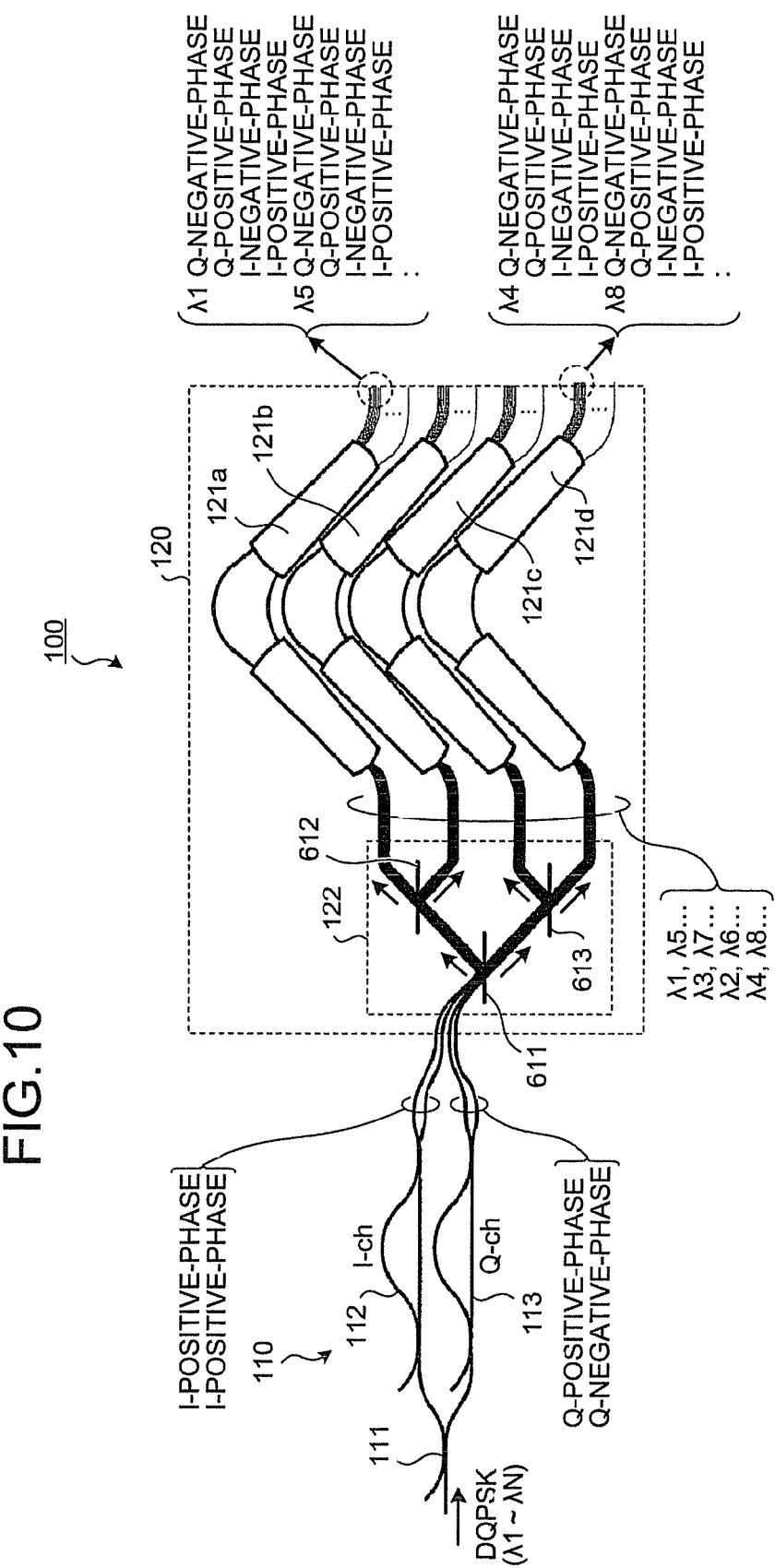
FIG. 10 is a block diagram of the demodulator and the wavelength separating unit of the optical receiving circuit according to a second embodiment.

FIG. 10 is a block diagram of the demodulator and the wavelength separating unit of the optical receiving circuit according to a second embodiment. In FIG. 10, constituent elements identical to those depicted in FIG. 2 are denoted by the same reference numerals used in FIG. 2, and are omitted in further description. As depicted in FIG. 10, the wavelength separating unit 120 of the optical receiving circuit 100 according to the second embodiment includes the interleaver 122 disposed downstream from the demodulator 110 and plural AWGs 121a to 121d disposed downstream from the interleaver 122.

The interleaver 122 branches an I-channel positive-phase signal, an I-channel negative-phase signal, a Q-channel positive-phase signal, and a Q-channel negative-phase signal output from the demodulator 110 for each wavelength to expand the wavelength interval. The filter film 611 receives parallel incident signals (I-positive-phase to Q-negative-phase) output from the demodulator 110. The transmission characteristic of the filter film 611 is set so that among the signals incident on the filter film 611, signal components of wavelengths λ2, λ4, λ6, λ8, . . . are transmitted while signal components of wavelengths λ1, λ3, λ5, λ7, . . . are reflected.

The filter film 612 receives the signal components (λ1, λ3, λ5, λ7, . . . ) that have been reflected by the filter film 611. The transmission characteristic of the filter film 612 is set so that among the signals incident on the filter film 612, the signal component of wavelength λ1, λ5, . . . are transmitted while the signal component of wavelength λ3, λ7, . . . are reflected.

The filter film 613 receives the signal components (λ2, λ4, λ6, λ8, . . . ) that have been transmitted by the filter film 611. The transmission characteristic of the filter film 613 is set so that among the signals incident on the filter film 613, the signal component of wavelength λ4, λ8, . . . , are transmitted while the signal component of wavelength λ2, λ6, . . . are reflected.

In this manner, optical signals output from the interleaver 122 come to have wavelength intervals that are respectively equivalent to four channels, which is four times the width of each wavelength interval between optical signals input to the interleaver 122. The AWGs 121a to 121d correspond in quantity to branches in the interleaver 122 and thus, four AWGs 121a to 121d are provided.

The configuration of each of the AWGs 121a to 121d is identical to the configuration of the AWG depicted in FIG. 3. The AWGs 121a to 121d each receive input of a corresponding optical signal among optical signals output from the interleaver 122 to separate the input optical signals according to wavelength, and thus separately output positive-phase signals and negative-phase signals corresponding to each other for each wavelength and channel. In this case, positive-phase signals and negative-phase signals corresponding to each other are output from adjacent output ports of the AWGs 121a to 121d.

For example, the AWG 121a receives input of the optical signals of wavelengths of λ1, λ5, . . . output from the interleaver 122, and outputs the optical signals in the order of a Q-channel negative-phase signal (λ1), a Q-channel positive-phase signal (λ1), an I-channel negative-phase signal (λ1), an I-channel positive-phase signal (λ1), a Q-channel negative-phase signal (λ5), a Q-channel positive-phase signal (λ5), an I-channel negative-phase signal (λ5), an I-channel positive-phase signal (λ5), . . . .

In this manner, when the interleaver 122 is disposed between the demodulator 110 and the AWGs 121a to 121d and another branch is added to the branches in the interleaver 122, another AWG 121 and another balanced receiver 130 are newly connected to the added branch output unit. In this way, an extra channel (wavelength) is added easily.

For example, in the initial state, if the number of branches in the interleaver 122 is one (no branch), a single unit of the AWG 121a is connected handling channels for the wavelengths λ1, λ5, . . . . In this case, the interleaver 122 may be omitted. If the number of channels is increased from the number of channels in the initial state and the number of branches in the interleaver 122 is determined to be two, the AWG 121b is newly connected handling channels for the wavelengths λ2, λ6, . . . . In this way, the number of channels is increased to two times the number of channels in the initial state.

In the same manner, when the number of branches in the interleaver 122 is determined to be three, the AWG 121c is newly connected handling channels for the wavelengths λ3, λ7, . . . to increase the number of channels to three times the number of channels in the initial state. In the same manner, when the number of branches in the interleaver 122 is determined to be four, the AWG 121d is newly connected handling channels for the wavelengths λ4, λ8, . . . to increase the number of channels to four times the number of channels in the initial state.

Figure 11:
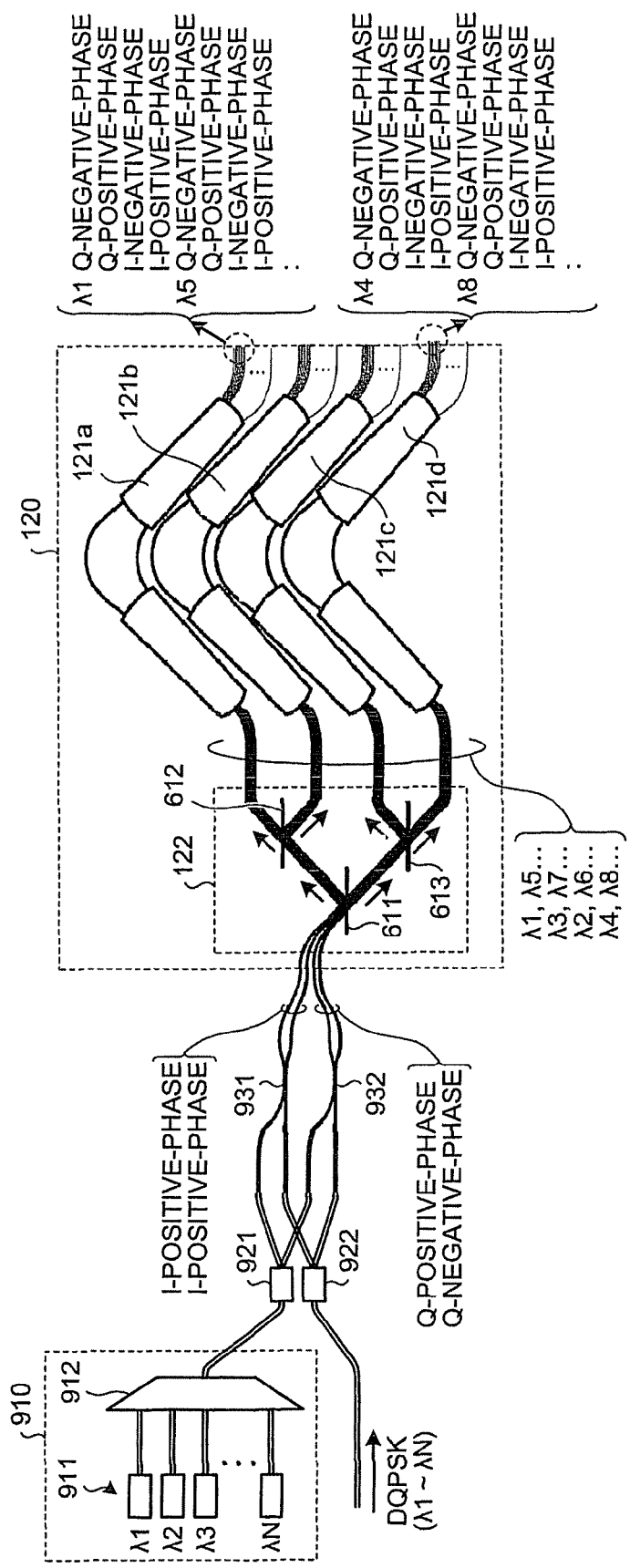
FIG. 11 is a block diagram of a modification of the optical receiving circuit according to the second embodiment.

FIG. 11 is a block diagram of a modification of the optical receiving circuit according to the second embodiment. A modified optical receiving circuit 100 according to the second embodiment and receiving an optical signal subjected to PSK modulation (coherent communication) will be described. In FIG. 11, constituent elements identical to those depicted in FIGS. 9 and 10 are denoted by the same reference numerals used in FIGS. 9 and 10, and are omitted in further description.

As depicted in FIG. 11, the modified optical receiving circuit 100 according to the second embodiment includes (in place of the demodulator 110) the local oscillating unit 910, the optical couplers 921 and 922, the I-channel mixer 931, and the Q-channel mixer 932 depicted in FIG. 9. The modified optical receiving circuit 100 according to the second embodiment is thus capable of receiving an optical signal subjected to PSK modulation (coherent communication).

In this manner, the optical receiving circuit 100 according to the second embodiment achieves the effects achieved by the optical receiving circuit 100 according to the first embodiment. Through the addition of another branch to the interleaver 122 and another AWG 121 corresponding to the added branch, the optical receiving circuit 100 according to the second embodiment further enables a step-by-step increase in channels (wavelengths) in response to an increase in data traffic.

Figure 12:
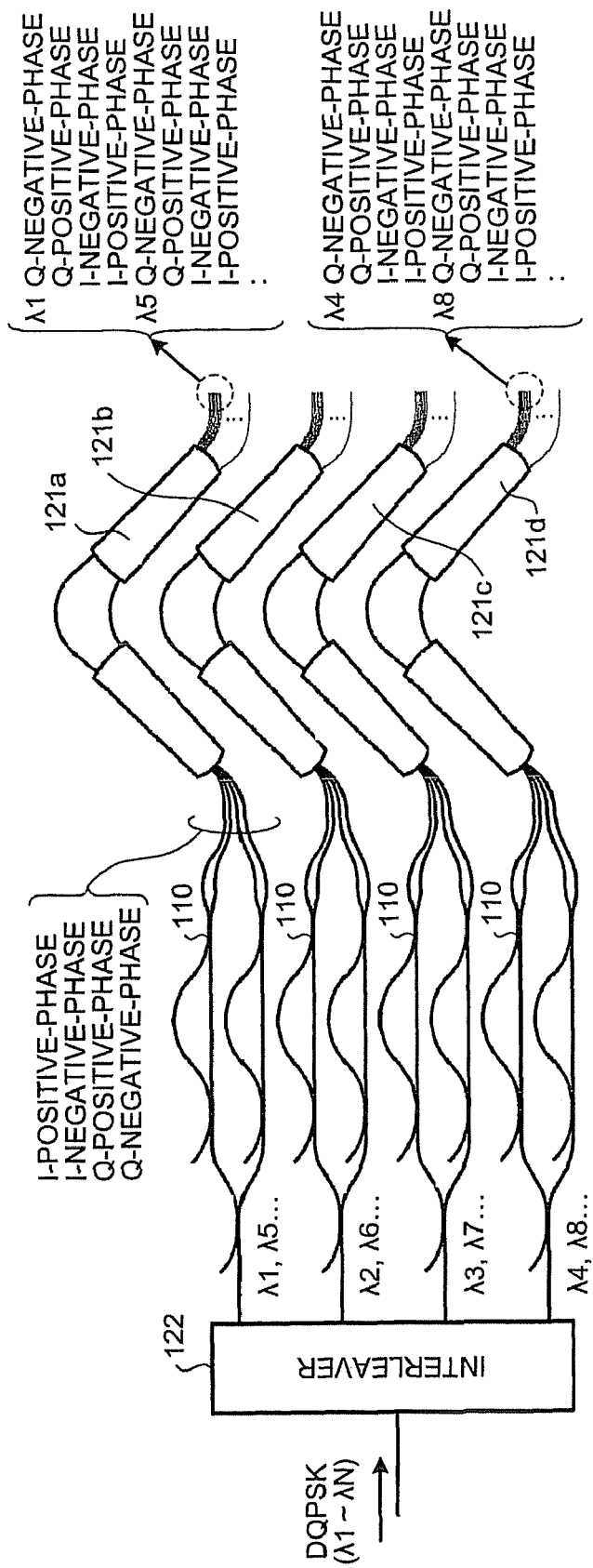
FIG. 12 is a block diagram of the demodulators and the wavelength separating unit of the optical receiving circuit according to a third embodiment.

FIG. 12 is a block diagram of the demodulators and the wavelength separating unit of the optical receiving circuit according to a third embodiment. In FIG. 12, constituent elements identical to those depicted in FIG. 2 are denoted by the same reference numerals used in FIG. 2, and are omitted in further description. As depicted in FIG. 12, the optical receiving circuit 100 according to the third embodiment includes plural demodulators 110 disposed downstream from the interleaver 122 and plural AWGs 121a to 121d disposed downstream from the demodulators 110.

The interleaver 122 branches an optical signal DQPSK (λ1 to λN) received by the optical receiving circuit 100 according to wavelength to expand the wavelength interval. The configuration of the interleaver 122 is identical to the configuration depicted in FIG. 10. In this case, the interleaver 122 outputs an optical signal DQPSK (λ1, λ5, . . . ), an optical signal DQPSK (λ2, λ6, . . . ), an optical signal DQPSK (λ3, λ7, . . . ), and an optical signal DQPSK (λ4, λ8, . . . ) to the demodulators 110, respectively.

The demodulators 110 correspond in quantity (number of phases M in phase modulation) to branches in the interleaver 122 and thus, four demodulators 110 are provided. Each of the demodulators 110 receives input of a corresponding optical signal among optical signals output from the interleaver 122 and extracts, from the input optical signals, positive-phase signals and negative-phase signals corresponding to each other for each channel. The demodulators 110 output the extracted optical signals (I-positive-phase, Q-negative-phase) to the AWGs 121a to 121d, respectively.

The AWGs 121a to 121d correspond in quantity to the branches in the interleaver 122 and thus, four AWGs are provided. The configuration of each of the AWGs 121a to 121d is identical to the configuration of the AWG depicted in FIG. 3. The AWGs 121a to 121d each receive input of a corresponding optical signal among optical signals output from the interleaver 122 to separate the input optical signals according to wavelength and thus, separately output positive-phase signals and negative-phase signals corresponding to each other for each wavelength and channel. In this case, positive-phase signals and negative-phase signals corresponding to each other are output from adjacent output ports of the AWGs 121a to 121d.

For example, the AWG 121a receives input of the optical signals of wavelengths of λ1, λ5, . . . (I-positive-phase to Q-negative-phase) output from the interleaver 122, and outputs the optical signals in the order of a Q-channel negative-phase signal (λ1), a Q-channel positive-phase signal (λ1), an I-channel negative-phase signal (λ1), an I-channel positive-phase signal (λ1), a Q-channel negative-phase signal (λ5), a Q-channel positive-phase signal (λ5), an I-channel negative-phase signal (λ5), an I-channel positive-phase signal (λ5), . . . .

In this manner, when the interleaver 122 is disposed upstream from the demodulators 110 and from the AWGs 121a to 121d and another branch is added to the branches in the interleaver 122, another demodulator 110, another AWG 121 and another balanced receiver 130 are newly connected to the added branch output unit. In this way, an extra channel (wavelength) is added easily (refer to description related to FIG. 10).

Figure 13:
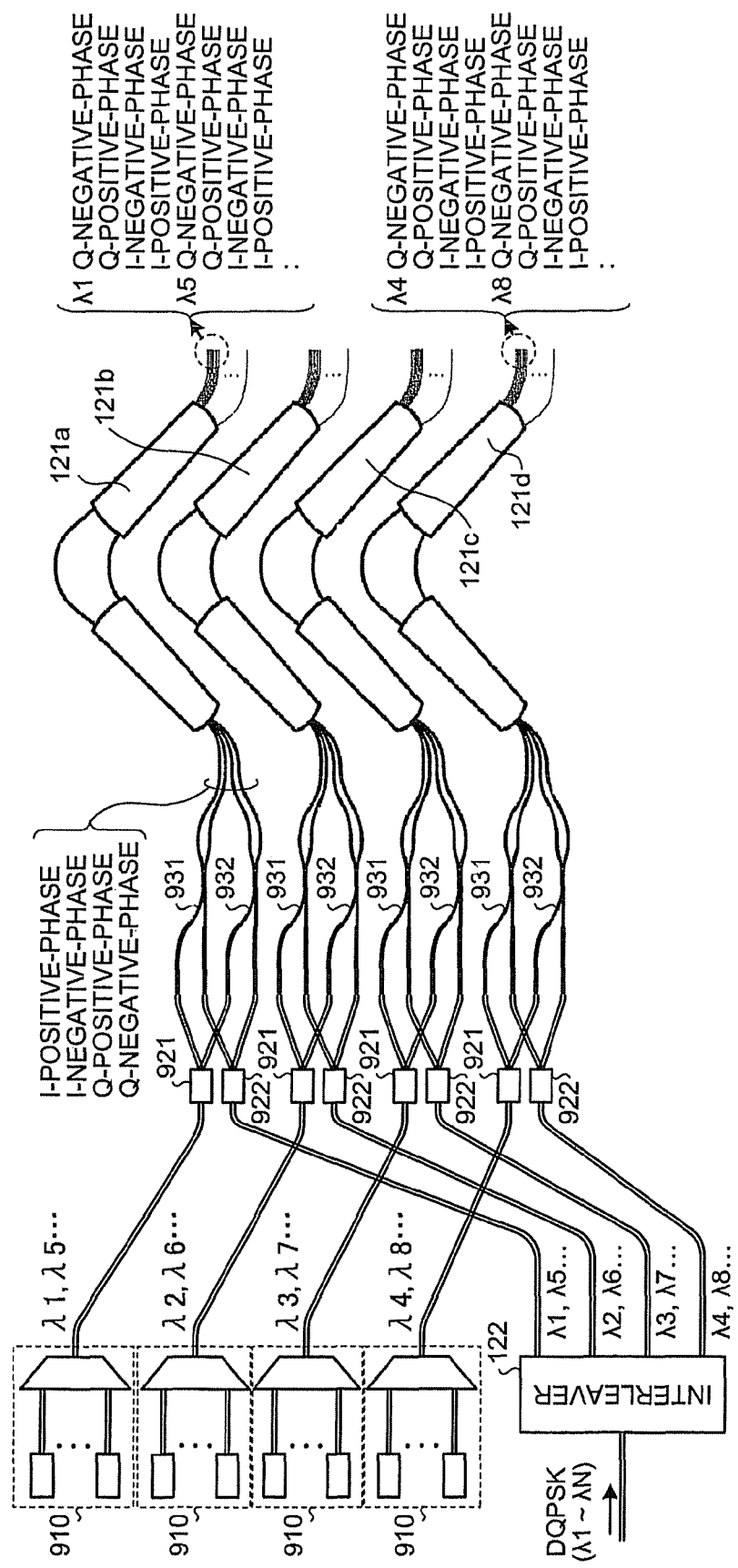
FIG. 13 is a block diagram of a modification of the optical receiving circuit according to the third embodiment.
Figure 14:
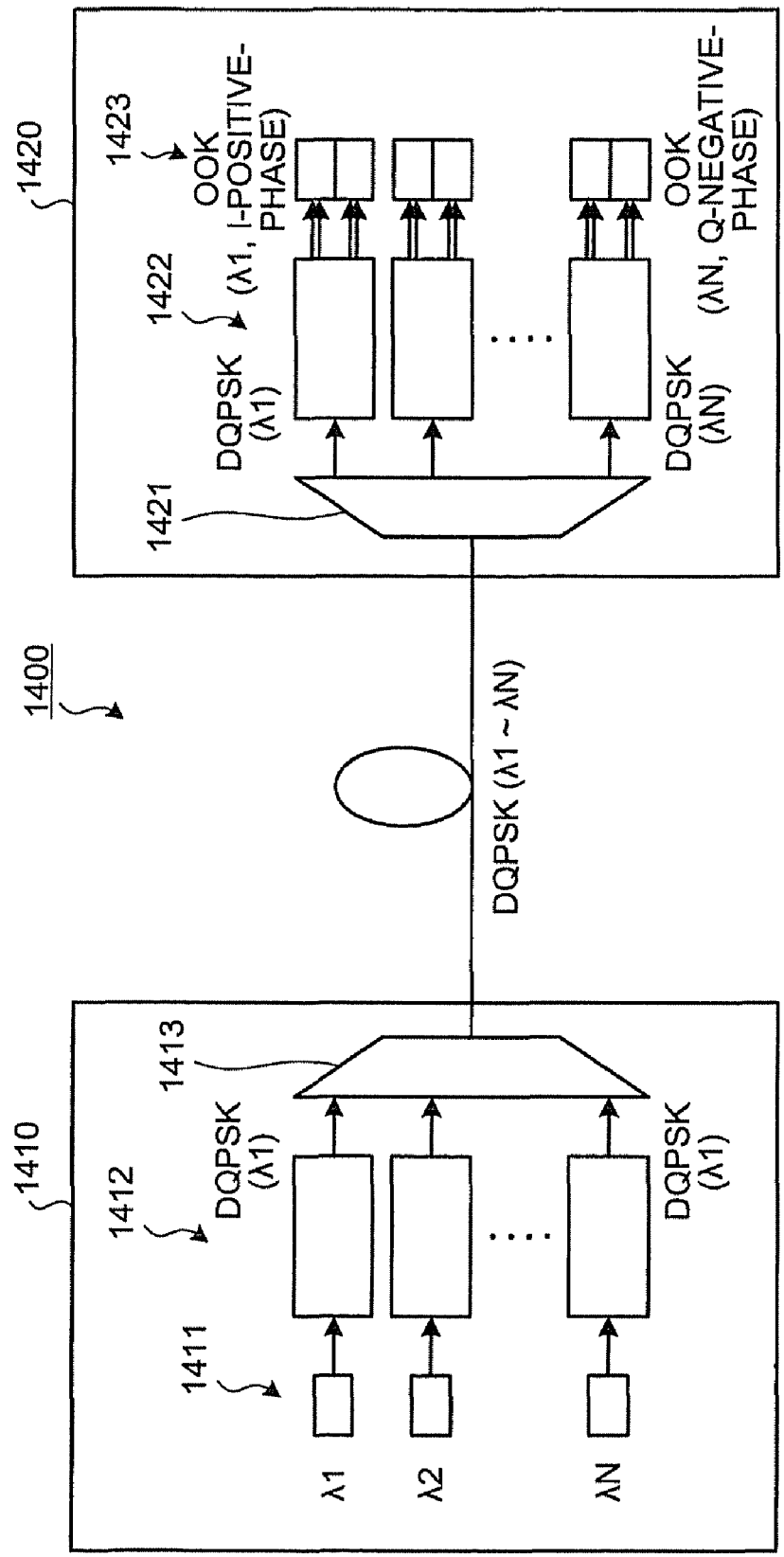
FIG. 14 is a block diagram of a conventional optical communication system.
Figure 15:
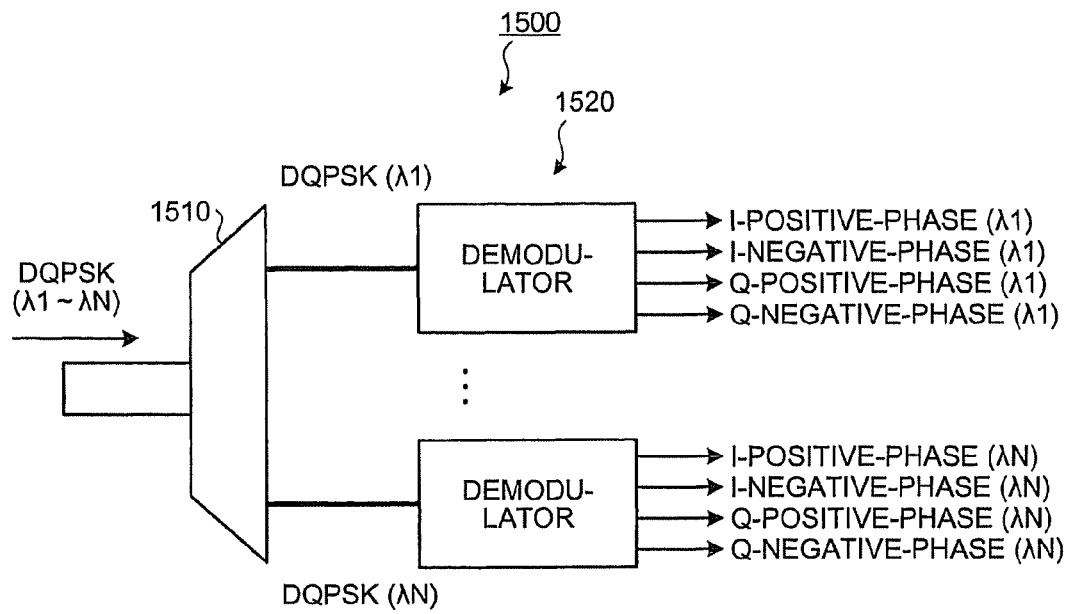
FIG. 15 is a block diagram of a configuration of part of a conventional optical receiving circuit.
Figure 16:
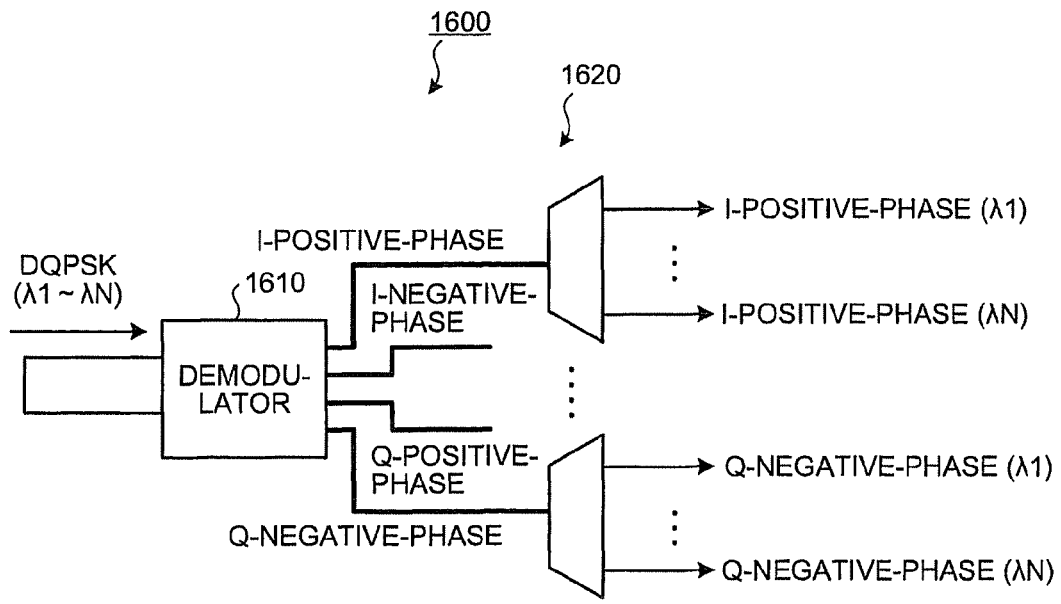
FIG. 16 is a block diagram of a configuration of a part of another conventional optical receiving circuit.
Figure 17:
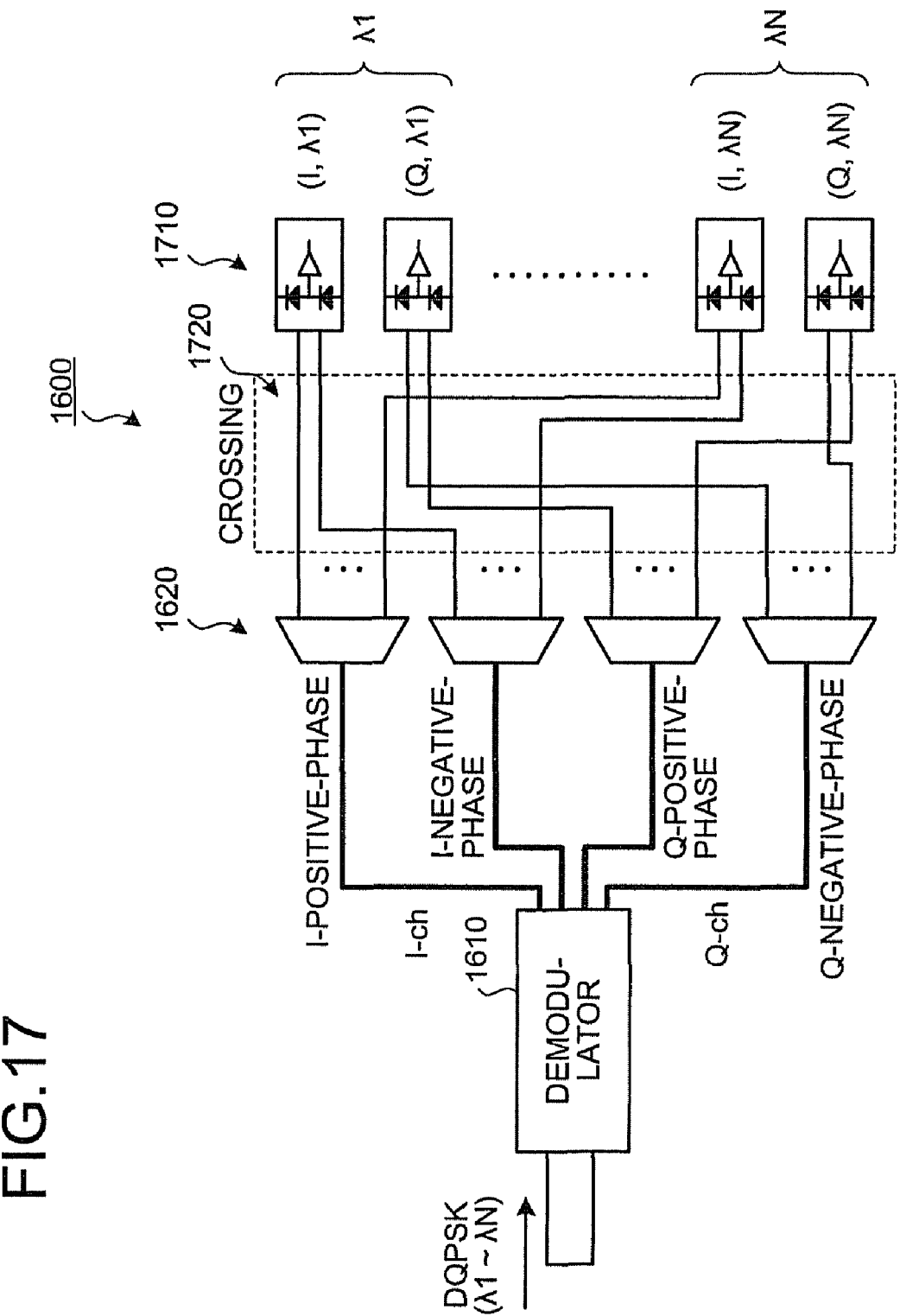
FIG. 17 is a block diagram of an optical receiving circuit to which the optical receiving circuit of FIG. 16 has been applied.

FIG. 13 is a block diagram of a modification of the optical receiving circuit according to the third embodiment. A modified optical receiving circuit 100 according to the third embodiment and receiving an optical signal subjected to PSK modulation (coherent communication) will be described. In FIG. 13, constituent elements identical to those depicted in FIGS. 9 and 12 are denoted by the same reference numerals used in FIGS. 9 and 12, and are omitted in further description.

As depicted in FIG. 13, the modified optical receiving circuit 100 according to the third embodiment includes (in place of the demodulator 110) plural local oscillating units 910, plural optical couplers 921 and 922, plural I-channel mixers 931, and plural Q-channel mixers 932 depicted in FIG. 9. The configuration of each of the local oscillating units 910 is in principle identical to the configuration of the local oscillating unit depicted in FIG. 9.

The quantity of the local oscillating units 910 corresponds to the quantity of phases M in phase modulation and thus, four local oscillating units 910 are provided. Four local oscillating units 910 output a beam of light including wavelengths (λ1, λ5, . . . ), beam of light including wavelengths (λ2, λ6, . . . ), an optical signal including wavelengths (λ3, λ7, . . . ), and an optical signal including wavelengths (λ4, λ8, . . . ).

The quantity of the optical couplers 921, the optical couplers 922, the I-channel mixers 931, and the Q-channel mixers 932 corresponds to the quantity of phases M in phase modulation and thus, four optical couplers 921, four optical couplers 922, four I-channel mixers 931, and four Q-channel mixers 932 are provided in a one-to-one correspondence to the wavelengths (λ1, λ5, . . . ), to the wavelengths (λ2, λ6, . . . ), to the wavelengths (λ3, λ7, . . . ), and to the wavelengths (λ4, λ8, . . . ), respectively.

Each of the four optical couplers 921, the four optical couplers 922, the four I-channel mixers 931, and the four Q-channel mixers 932 receives input of light or an optical signal of a corresponding wavelength from four local oscillating units 910 and the interleaver 122, and extracts positive-phase signals and negative-phase signals corresponding to each other for each channel, from the input optical signals. The modified optical receiving circuit 100 according to the third embodiment is thus capable of receiving an optical signal subjected to PSK modulation (coherent communication).

In this case, positive-phase signals and negative-phase signals corresponding to each other are output from adjacent output ports of the AWGs 121a to 121d (see the description of FIG. 12). When another channel is added to the modified optical receiving circuit 100 according to the third embodiment, additional local oscillating units 910 corresponding in quantity to the branches added to the interleaver 122 are also added.

In this manner, the optical receiving circuit 100 according to the third embodiment achieves the effect achieved by the optical receiving circuit 100 according to the first embodiment. Through the addition of another branch to the interleaver 122 and another modulator 110 and AWG 121 corresponding to the added branch, the optical receiving circuit 100 according to the third embodiment enables a step-by-step increase in channels (wavelengths) in response to an increase in data traffic.

As described, according to the optical receiving circuit of the present embodiments, optical path lengths for a positive-phase signal and a negative-phase signal that correspond to each other and are input to the same balanced receiver are uniformed to improve demodulation precision while also reducing the size and cost of the optical receiving circuit.

Although a configuration in which a wavelength separator of the wavelength separating unit 120 is provided as the AWG 121 is described in the embodiments, the wavelength separator of the wavelength separating unit 120 is not limited hereto. If a wavelength separator has plural input ports and plural output ports, separates input signals according to wavelength, and outputs adjacent input signals as adjacent output signals, such a wavelength separator may replace the AWG 121.

In the embodiments, although a configuration is described in which a positive-phase signal and a negative-phase signal corresponding to each other are output, from the AWG 121, in a state of being adjacent to each other, configuration is not limited hereto and may be a configuration in which corresponding I-channel signals and Q-channel signals are output in a state of being adjacent to each other (see, e.g., FIG. 1). In such a configuration, sets of data, each set resulting from demodulation of the corresponding I-channel signals and Q-channel signals, are output in a state of being adjacent to each other, for each wavelength.

This resolves the problem of the optical cables 125 crossing each other downstream from the balanced receivers 130, and one set of the balanced receivers 130 receiving incoming corresponding I-channel signals and Q-channel signals may be configured as an integrated assembly, and thereby, further reducing the size and cost of the optical receiving circuit 100.

In the embodiments, optical signals are not separated completely according to wavelength by the AWG 121 along but are ultimately separated completely by the interleaver 122. When the quantity of multiplexed waves is small, however, a configuration enabling the AWG 121 to solely separate the optical signals completely for each wavelength may be adopted, in which case the interleaver 122 may be omitted.

Hereinafter, in the embodiments, the number of output ports that the AWG 121 shifts for each optical signal channel (wavelength) is P. The quantity of outputs of the demodulator or of the mixers is M. The number of multiplexed waves resulting from WDM performed on an optical signal is N.

Although the optical receiving circuit 100 according to the embodiments has been described as the optical receiving circuit 100 receiving and demodulating an optical signal subjected to DQPSK or QPSK modulation (in which the quantity outputs M of the demodulator is 4), the optical receiving circuit 100 according to the embodiments is applicable in general to any optical receiving circuit that receives and demodulates an optical signal subjected to modulation of binary DPSK, binary PSK, multivalue DPSK, or multivalue PSK. M is 2 in the binary DPSK and binary PSK, while M is 4 in the multivalue DPSK and multivalue PSK for creating four or more values in modulation.

Although a configuration of the optical receiving circuit 100 according to the embodiments has been described as a configuration in which the number of output ports that the AWG 121 shifts for each optical signal channel (wavelength) is P is determined to be 1 (see, e.g., FIG. 3), the number of output ports P may be 2 or more.

Although a configuration in which the number of input ports and output ports of the AWG 121 is 4 and 7 has been described with reference to FIG. 3, it is sufficient if the number of input ports is at least equal to the number of outputs M of the demodulator. For example, when binary phase modulation, such as DBPSK, is performed, two or more input ports are provided. When 8-value phase modulation, such as 8-PSK, is performed, four or eight or more input ports are provided. It is sufficient if the number of output ports is at least M+P×(N−1).

Although a configuration has been described in which the interleaver 122 branches an input optical signal into four branch optical signals to expand the wavelength interval into a wavelength interval four times the original, it is sufficient if the interleaver 122 expands the wavelength interval of an input optical signal into a wavelength interval of at least M/P times the original. For example, when 4-value phase modulation, such as DQPSK and QPSK, is performed and the output ports of the AWG 121 are shifted two ports by two ports for each channel (wavelength) for optical signals, the interleaver 122 branches an input optical signal at least into two branch signals to expand a wavelength interval into a wavelength interval at least two times the original.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical receiving circuit that receives and demodulates an optical signal subjected to phase modulation and wavelength division multiplexing, comprising:
   an interfering unit that causes a reference signal for phase comparison to interfere with the optical signal to output resulting signals as positive-phase signals and negative-phase signals;
   a wavelength separator having a plurality of input ports receiving the positive-phase signals and the negative-phase signals, the positive-phase signals and negative-phase signals being adjacent to each other, the wavelength separator further having a plurality of output ports, and separating according to wavelength, the positive-phase signals and the negative-phase signals, and from the output ports, outputting for each wavelength, a separated positive-phase signal and negative-phase signal in a state of being adjacent to each other; and
   a plurality of balanced receivers respectively provided for each wavelength, where a given balanced receiver for a given wavelength performs balanced reception and demodulation of the separated positive-phase signal and negative phase signal of the given wavelength.

2. The optical receiving circuit according to claim 1, wherein
   the interfering unit has M outputs,
   the wavelength separator, shifting the output ports by P ports for each wavelength, outputs the positive-phase signal and negative-phase signal separated for each wavelength, and further includes an interleaver that, for each wavelength, branches the optical signal to expand an initial wavelength interval of the optical signal into a wavelength interval at least M/P times the initial wavelength interval.

3. The optical receiving circuit according to claim 2, wherein
   the interleaver branches, for each wavelength, a positive-phase signal and negative-phase signal output from the interfering unit, and
   the balanced receivers perform balanced reception of the positive-phase signal and negative-phase signal having a wavelength interval expanded by the interleaver.

4. The optical receiving circuit according to claim 2, wherein
   the interleaver branches, for each wavelength, a positive-phase signal and negative-phase signal output from the interfering unit, and
   a plurality of the wavelength separators are provided in a quantity corresponding to the quantity of branches at the interleaver, the wavelength separators separating according to wavelength, the positive-phase signals and the negative-phase signals having a wavelength interval expanded by the interleaver.

5. The optical receiving circuit according to claim 2, wherein
   a plurality of the interfering units are provided in a quantity corresponding to the quantity of branches at the interleaver, the interfering units causing the reference signal to interfere with the optical signal having a wavelength interval expanded by the interleaver.

6. The optical receiving circuit according to claim 2, wherein
   the interleaver is a multifilm filter comprising a plurality of parallel filter films each having a unique transmission characteristic, and
   the optical signal enters the filter film at an incident angle of approximately 45°.

7. The optical receiving circuit according to claim 1, wherein
   the optical signal is an optical signal that is subjected to phase modulation and wavelength division multiplexing of a quantity of N multiplexed waves, and
   the wavelength separator outputs, from the output ports shifted P ports for each wavelength, the positive-phase signal and negative-phase signal separated for each wavelength and has a quantity of the input ports at least equivalent to the quantity of outputs M at the interfering unit and further has at least M·P×(N−1) units of the output ports.

8. The optical receiving circuit according to claim 1, wherein
   the interfering unit is a delay interferometer that causes a delay signal to interfere, as the reference signal, with the optical signal, the delay signal being generated by delaying the optical signal by one symbol.

9. The optical receiving circuit according to claim 1, further comprising
   a local oscillator that outputs the reference signal, wherein
   the interfering unit is a mixer that causes the reference signal output from the local oscillator to interfere with the optical signal.

10. The optical receiving circuit according to claim 1, further comprising
    a taped fiber that conveys the positive-phase signals and the negative-phase signals from the wavelength separator to the balanced receivers.

11. The optical receiving circuit according to claim 1, wherein
    the wavelength separator is an arrayed waveguide grating.

* * * * *